US012221299B1

(12) United States Patent
Weinstein et al.

(10) Patent No.: US 12,221,299 B1
(45) Date of Patent: Feb. 11, 2025

(54) SYSTEMS AND METHODS FOR FILLING A PROPPANT SILO

(71) Applicant: SOLARIS OILFIELD SITE SERVICES OPERATING LLC, Houston, TX (US)

(72) Inventors: Jeremy Weinstein, Tomball, TX (US); Scott Lambert, The Woodlands, TX (US); Jeffrey Martinez, The Woodlands, TX (US)

(73) Assignee: SOLARIS OILFIELD SITE SERVICES OPERATING LLC, Houston, TX (US)

( * ) Notice: Subject to any disclaimer, the term of this patent is extended or adjusted under 35 U.S.C. 154(b) by 0 days.

(21) Appl. No.: 18/584,231

(22) Filed: Feb. 22, 2024

(51) Int. Cl.
*B65G 65/32* (2006.01)
*B65G 17/12* (2006.01)
*B65G 41/00* (2006.01)

(52) U.S. Cl.
CPC .......... *B65G 65/32* (2013.01); *B65G 17/126* (2013.01); *B65G 41/002* (2013.01); *B65G 41/008* (2013.01); *B65G 2201/045* (2013.01)

(58) Field of Classification Search
CPC .. B65G 17/126; B65G 41/002; B65G 41/008; B65G 65/32; B65G 2201/045
USPC ................................................. 414/332, 919
See application file for complete search history.

(56) References Cited

U.S. PATENT DOCUMENTS

| | | | |
|---|---|---|---|
| 3,090,501 A | 5/1963 | Auld | |
| 3,458,177 A * | 7/1969 | Farnham | E01C 19/1009 |
| | | | 414/919 |
| 3,938,673 A | 2/1976 | Perry, Jr. | |
| 3,998,436 A | 12/1976 | Allen et al. | |
| 4,337,014 A * | 6/1982 | Farnham | E04H 7/30 |
| | | | 414/800 |
| 5,297,914 A * | 3/1994 | Ash | B65G 67/24 |
| | | | 198/313 |

(Continued)

FOREIGN PATENT DOCUMENTS

| | | |
|---|---|---|
| AU | 2011101709 A4 | 5/2012 |
| WO | 2020150808 A1 | 7/2020 |

OTHER PUBLICATIONS

Foresite Logistics, photo examples for silo filling system, https://www.foresitelogistics.com/, 8 pages.

(Continued)

*Primary Examiner* — James Keenan
(74) *Attorney, Agent, or Firm* — MH2 Technology Law Group, LLP

(57) ABSTRACT

A system includes a base configured to be positioned on a ground. The base includes a funnel configured to be positioned under a knife gate. The base also includes a first conveyor positioned under the funnel. The funnel is configured to direct a material from the knife gate onto a middle portion of the first conveyor. The system also includes a derrick having a first end that is coupled to the base. The derrick includes a second conveyor configured to receive the material from the first conveyor and to convey the material upward when the system is in an unfolded state. The derrick also includes a drum motor positioned proximate to an end of the derrick and configured to provide power to the second conveyor. The system also includes a first arm having a first end that is coupled to the end of the derrick.

26 Claims, 23 Drawing Sheets

(56) References Cited

U.S. PATENT DOCUMENTS

| | | | | |
|---|---|---|---|---|
| 5,964,566 | A | * 10/1999 | Stewart | B65G 47/18 |
| | | | | 198/550.12 |
| 6,474,926 | B2 | * 11/2002 | Weiss | B65D 88/30 |
| | | | | 414/919 |
| 7,090,066 | B2 | 8/2006 | Kirsch | |
| 8,926,252 | B2 | 1/2015 | McIver et al. | |
| 9,428,348 | B2 | 8/2016 | Teichrob et al. | |
| 9,499,335 | B2 | 11/2016 | McIver et al. | |
| 9,624,036 | B2 | * 4/2017 | Luharuka | B65G 67/00 |
| 9,663,303 | B2 | 5/2017 | Waldner et al. | |
| 9,873,602 | B2 | 1/2018 | Beck | |
| 10,053,308 | B2 | 8/2018 | Towes et al. | |
| 10,300,830 | B2 | 5/2019 | McIver et al. | |
| 10,399,785 | B1 | 9/2019 | Fike et al. | |
| 10,414,319 | B2 | 9/2019 | Friesen | |
| 10,457,504 | B2 | 10/2019 | Herman | |
| 10,577,198 | B2 | 3/2020 | Friesen | |
| 10,584,003 | B2 | * 3/2020 | Friesen | B65G 47/44 |
| 10,633,174 | B2 | 4/2020 | Pham et al. | |
| 10,793,363 | B2 | * 10/2020 | Chung | B65G 21/2081 |
| 10,895,114 | B2 | 1/2021 | Luharuka et al. | |
| 11,278,033 | B2 | * 3/2022 | Nothum, Jr. | B65G 47/12 |
| 11,691,831 | B2 | 7/2023 | Sleeman et al. | |
| 11,780,689 | B1 | 10/2023 | Brenden et al. | |
| 11,858,760 | B1 | 1/2024 | Weinstein et al. | |
| 2005/0115416 | A1 | * 6/2005 | Pasek | B65G 41/002 |
| | | | | 99/386 |
| 2012/0241290 | A1 | 9/2012 | Gausman et al. | |
| 2013/0118862 | A1 | * 5/2013 | Stewart | B65G 41/002 |
| | | | | 198/300 |
| 2016/0258267 | A1 | 9/2016 | Payne et al. | |
| 2018/0297503 | A1 | 10/2018 | Hughes et al. | |
| 2019/0016536 | A1 | 1/2019 | Campbell et al. | |
| 2020/0048985 | A1 | * 2/2020 | Oehler | B65G 27/16 |
| 2020/0140202 | A1 | 5/2020 | Grose et al. | |
| 2021/0292096 | A1 | * 9/2021 | MacDonald | E21F 13/08 |
| 2021/0354910 | A1 | 11/2021 | Grimes et al. | |
| 2023/0013683 | A1 | * 1/2023 | Thiessen | B65D 88/32 |
| 2023/0312251 | A1 | * 10/2023 | Bowlin | B65G 65/32 |

OTHER PUBLICATIONS

Klun Topload, photo examples for filling system, https://klunsolutions.com/, 6 pages.

TSS Belt, photo example of silo filling system, https://tssands.com/services/, 5 pages.

Cambelt Oil and Gas Equipment, Conveyor Systems for Mining, https://cambelt.com/mining-conveyor-belts/, 5 pages.

Catapult, Case Study: Creating Value with ESG Solutions for Frac Sand: Sil Industrial Minerals, Catapult Solutions and Crew EnergyInc. Collaborate to Meet ESG Commitments, 2019 Catapult Solutions, 7 pages.

Dynatek, Articulated Loading Systems, Sales Brochure, 5 pages.

Norstar, PBE—200TM, 2015 Sales Brochure, 3 pages.

Sahara, Sand Source Sahara, Trinity Animation, photo—1 page.

Schlumgerger Limited, 2018 Annual Report, 24 pages.

Spearhead Sand, The SandMinion, SM1000 Specs, by Spearhead Sand Inc., 6 pages.

Author Unknown, Telestack Shiploading Solutions Animation, viewed Aug. 17, 2016, https://www.youtube.com/watch?v=d-iuzMbKbkE, 2 pages.

Spanco, Freestanding Articulating Jib Cranes—402 Series, The Wayback Machine, https://web.archive.org/web/20210507202530/https://www.spanco.com/product/articulating-jib-cranes/, 8 pages.

Author Unknown, Lemar Grain Reclaim, viewed Apr. 21, 2018, https://www.youtube.com/watch?v=09MbOoSC3qs, 1 page.

Author Unknown, TeleStacker® Conveyor and RazerTail® Truck Unloader Loading Ships in FL, viewed Apr. 30, 2015, https://www.youtube.com/watch?v=NLSZF1fcR2Y, 1 page.

Jaycee Handling Solutions, Articulated Arm, article, 2 pages.

Dynateck, EconoLoaderTM—Belt Conveyor Design, Sales Brochure, 2 pages.

Foresite Logistics, photo examples for silo filling system, 2 pages.

Klun Topload, photo examples for filling system, 3 pages.

TSS Belt, photo example of silo filling system, 1 page.

Sandbank, Proppant Silo System, NOV Completion & Production Solutions, 2018 National Oilwell Varco All rights reserved—5221_ENG_vol. 01, 2 pages.

OSHA, U.S. Department of Labor, "Working Exposure to Silica during Hydraulic Fracturing", https://www.osha.gov/sites/default/files/publications/hydraulic_frac_hazard_alert.pdf, 7 pages, Jun. 2012.

Dynatek, EconoLoader, Air Slide Conveyor Design, https://web.archive.org/web/20160819062313/http://mcschroeder.com/wp-content/uploads/2012/09/Product-Spec-Sheet-Air-Slide-EconoLoader.pdf, 2 pages.

Dynatek, EconoLoader, Screw Conveyor Design, https://web.archive.org/web/20160819112209/http://mcschroeder.com/wp-content/uploads/2012/09/Product-Spec-Sheet-Auger-EconoLoader.pdf, 2 pages.

Dynatek, EconoLoader, Drag Conveyor Design, https://web.archive.org/web/20160819173056/http://mcschroeder.com/wp-content/uploads/2012/09/Product-Spec-Sheet-Drag-EconoLoader1.pdf, 2 pages.

Kania, L., et al. (2012). "A Catalogue Capacity of Slewing Bearings". Mechanism and Machine Theory, 58, pp. 29-45.

SKF, Slewing Bearings, https://web.archive.org/web/20200402104046/https://www.skf.com/group/products/slewing-bearings, 4 pages.

OSHA, U.S. Department of Labor, "Hydraulic Fracturing and Flowback Hazards Other than Respirable Silica", OSHA 3763-12, 2014, https://www.osha.gov/sites/default/files/publications/OSHA3763.pdf, 27 pages.

* cited by examiner

SYSTEMS AND METHODS FOR FILLING A PROPPANT SILO

BACKGROUND

Hydraulic fracturing (also called fracking) is a well-stimulation technique involving the fracturing of bedrock formations by a pressurized liquid. The process involves the high-pressure injection of a fracking fluid into a wellbore to create fractures (e.g., cracks) in the deep-rock formations. The fracking fluid may be or include water containing proppants (e.g., sand or aluminum oxide) suspended with the aid of thickening agents. When the hydraulic pressure is removed from the wellbore, the proppants hold the fractures open to allow natural gas, petroleum, and/or brine to flow through the fractures, up the wellbore, and to the surface.

The proppants may be stored in one or more silos at the wellsite. The proppant is typically loaded into the silos by either a conventional pneumatic conveyor or a conventional belt conveyor. The conventional pneumatic conveyer has a low transfer rate (e.g., 1000-1500 pounds per minute). The conventional belt conveyor cannot be sloped at an angle greater than about 15 degrees. As a result, the conventional belt conveyor has a large footprint at the wellsite (e.g., about 100 feet).

SUMMARY

A system is disclosed. The system includes a base configured to be positioned on a ground. The base includes a funnel configured to be positioned under a knife gate. The base also includes a first conveyor positioned under the funnel. The funnel is configured to direct a material from the knife gate onto a middle portion of the first conveyor. The system also includes a derrick having a first end that is coupled to the base. The derrick includes a second conveyor configured to receive the material from the first conveyor and to convey the material upward when the system is in an unfolded state. The derrick also includes a drum motor positioned proximate to an end of the derrick and configured to provide power to the second conveyor. The system also includes a first arm having a first end that is coupled to the end of the derrick.

A mobile silo-filling system is also disclosed. The system includes a base configured to be positioned on a ground. The base includes a funnel configured to be positioned under a knife gate. The base also includes a first conveyor positioned under the funnel. The knife gate is configured to release a proppant that flows through the funnel and onto the first conveyor. The funnel centers the proppant on the first conveyor such that greater than about 90% of the proppant is positioned within a middle 80% of a width of the first conveyor. The first conveyor is configured to convey the proppant. The first conveyor is a trough-style unloading conveyor. The system also includes a derrick having a first end that is coupled to the base. The derrick is configured to be oriented substantially horizontally when the system is in a folded state. The system is configured to be coupled to a vehicle and to be moved by the vehicle when in the folded state. The derrick is configured to be oriented substantially vertically when the system is in an unfolded state. The derrick includes a second conveyor configured to receive the proppant from the first conveyor and to convey the proppant when the system is in the unfolded state. The second conveyor is a bucket elevator. The derrick also includes a drum motor positioned proximate to a second end of the derrick. The drum motor is positioned within a housing. The drum motor powers the second conveyor. A length of the drum motor is from about 30 inches to about 40 inches, and a width of the drum motor is from about 22 inches to about 27 inches to allow the drum motor to be received within a bonnet or a head roller of the second conveyor. The drum motor allows the second conveyor to raise from about 300 tons to about 600 tons of the proppant from about 50 feet to about 100 feet in an hour. The system also includes a first arm having a first end that is coupled to the second end of the derrick. The first arm is configured to be substantially horizontal when the system is in the folded state and the unfolded state. The first arm is configured to rotate around the first end thereof in a first horizontal plane. The first arm includes a third conveyor configured to receive the proppant from the second conveyor and to convey the proppant. The third conveyor is a trough-style distributing conveyor. The system also includes a second arm having a first end that is coupled to a second end of the first arm. The second arm is positioned below the first arm. The second arm is configured to be substantially horizontal when the system is in the folded state and the unfolded state. The second arm is configured to rotate around the first end thereof in a second horizontal plane. The second arm includes a fourth conveyor configured to receive the proppant from the third conveyor and to convey the proppant. The fourth conveyor is a trough-style distributing conveyor. The system also includes a loading spout coupled to the second arm proximate to a second end of the second arm. The loading spout is configured to telescope vertically. The loading spout is configured to receive the proppant from the fourth conveyor and to load the proppant into an inlet in an upper portion of a silo.

A method for loading proppant into a silo is also disclosed. The method includes transporting a system to a site. The system includes a base, a derrick, a first arm, and a second arm. A first portion of the base includes a first conveyor. A second portion of the base includes a chassis, a suspension, and wheels. The first and second portions of the base are decoupled from one another while the system is being transported. The method also includes actuating the system from a folded state into an unfolded state at the site. The derrick is oriented substantially horizontally when the system is in the folded state. The derrick is oriented substantially vertically when the system is in the unfolded state. The method also includes coupling the first and second portions of the base together when the system is in the unfolded state. The method also includes positioning a knife gate over the first conveyor after the first and second portions of the base are coupled together. The method also includes transferring the proppant from the knife gate to the first conveyor. Transferring the proppant includes fully opening the knife gate. The proppant is transferred through a funnel of the base and onto a middle portion of the first conveyor, Less than 5% of the proppant is positioned on opposing outer edges of the first conveyor. The opposing outer edges each make up about 10% of a width of the first conveyor. The method also includes conveying the proppant to the silo. The proppant is conveyed from the first conveyor on the base to a second conveyor on the derrick, to a third conveyor on the first arm, to a fourth conveyor on the second arm, and into the silo. The second conveyor is powered by a drum motor that is positioned proximate to an upper end of the derrick.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

Figure 1:
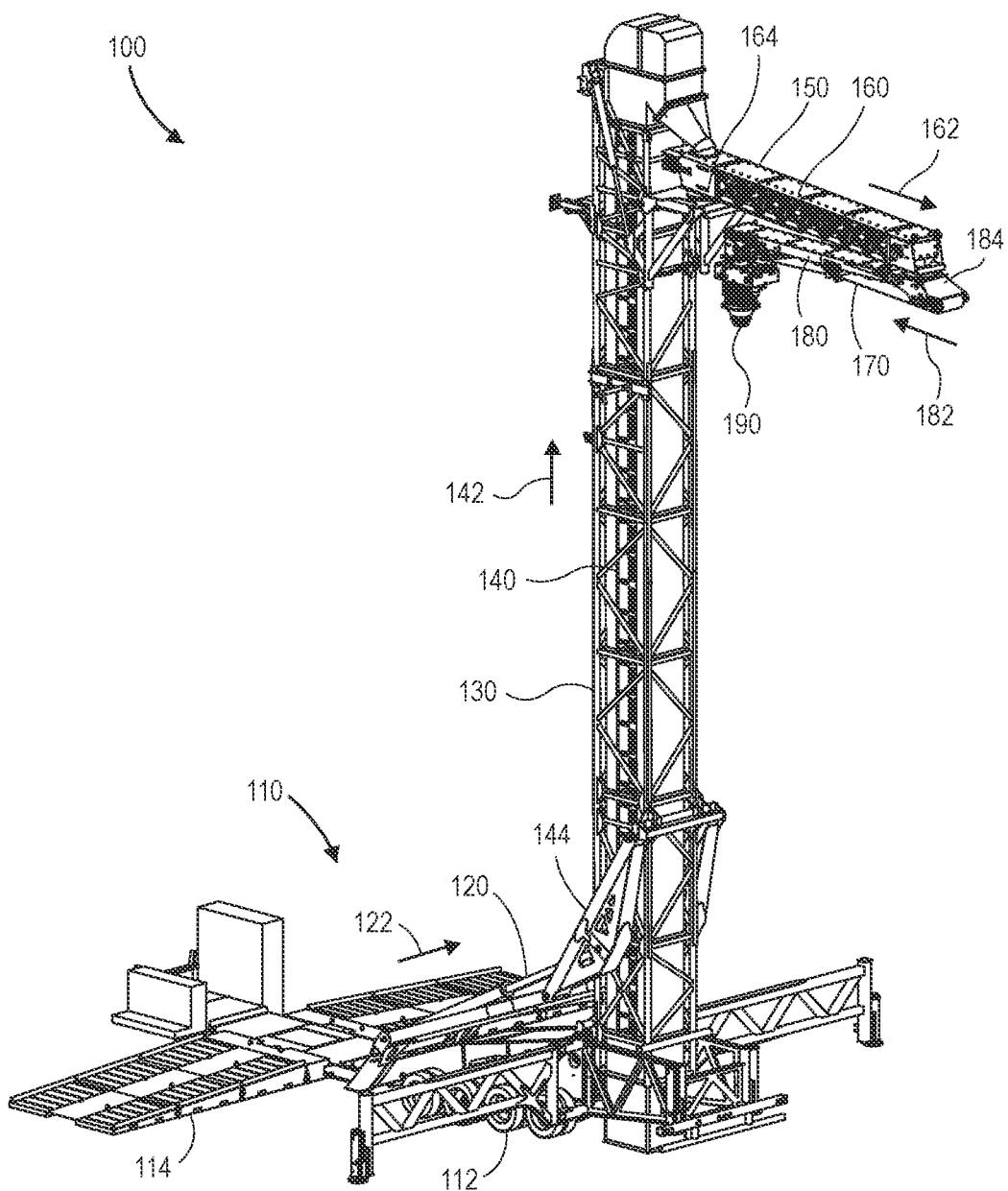
FIG. 1 illustrates a perspective view of a mobile silo-filling system, according to an embodiment.

FIG. 1 illustrates a perspective view of a mobile silo-filling system 100, according to an embodiment. The system 100 may be configured to transport or convey a material from a first (e.g., lower) location to a second (e.g., upper) location. The material may be or include a granular material. For example, the material may be a proppant (e.g., sand or aluminum oxide particles) that may be used to produce a fracking fluid, and the upper location may be an inlet of a vertical silo at a wellsite.

The system 100 may include a base 110 that is configured to be position on the ground at the wellsite. The base 110 may include a truck unloader 112 (e.g., including one or more wheels). The base 110 may also include one or more loading ramps 114 that slope upward toward one another. The loading ramps 114 may be detachable. They may be carried as a separate load and installed at the location (e.g., the wellsite) after the system 100 has been deployed.

The base 110 may also include a first (e.g., trough-style unloading) conveyor 120. The first conveyor 120 may be configured to convey the material (e.g., proppant) from a truck in a first direction 122. The first direction 122 may be horizontal or sloped upwards (e.g., from about 5 degrees to about 30 degrees).

The system 100 may also include a derrick 130 that is coupled to the base 110. More particularly, a first (e.g., lower) end of the derrick 130 may be coupled to the base 110. The derrick 130 may be configured to rotate (e.g., about a central longitudinal axis therethrough) with respect to the (e.g., stationary) base 110. The derrick 130 may include a second (e.g., bucket elevator) conveyor 140 therein, which may differ from the first (e.g., trough-style unloading) conveyor 120. The second conveyor 140 may be coupled to and/or in communication with the first conveyor 120. More particularly, the second conveyor 140 may be configured to receive the material from the first conveyor 120 and to convey the material in a second (e.g., vertical) direction 142. The system 100 may also include one or more hydraulic cylinders 144 that is/are configured to actuate the derrick 130 from a substantially horizontal position to a substantially vertical position, as described below.

The system 100 may also include a first arm 150 that is coupled to the derrick 130. More particularly, a first (e.g., inner) end of the first arm 150 may be coupled to a second (e.g., upper) end of the derrick 130. The first arm 150 may be configured to rotate with respect to the derrick 130. More particularly, the first arm 150 may rotate around the first end thereof in a horizontal plane through an angle. A maximum extent of the angle may be from about 90 degrees to about 360 degrees or from about 180 degrees to about 270 degrees. The first arm 150 may include a third (e.g., trough-style distributing) conveyor 160, which may differ from the first (e.g., trough-style unloading) conveyor 120 and/or the second (e.g., bucket elevator) conveyor 140. The third conveyor 160 may be coupled to and/or in communication with the second conveyor 140. The third conveyor 160 may be configured to receive the material from the second conveyor 140 and to convey the material in a third (e.g., horizontal) direction 162. In one embodiment, the material may be transferred from the second conveyor 140 to the third conveyor 160 via one or more first slewing drives (also referred to as slewing gears) 164.

The system 100 may also include a second arm 170 that is coupled to the first arm 150. More particularly, a first end of the second arm 170 may be coupled to a second (e.g., outer) end of the first arm 150. The second arm 170 may be positioned at least partially below the first arm 150. The second arm 170 may be configured to rotate with respect to the first arm 150. More particularly, the second arm 170 may rotate around the first end thereof in a horizontal plane through an angle. A maximum extent of the angle of the second arm 170 may be greater than a maximum extent of the angle of the first arm 150. In an example, the maximum extent of the angle of the second arm 170 may be from about 180 degrees to about 360 degrees or from about 270 degrees to about 360 degrees. The second arm 170 may include a fourth (e.g., trough-style distributing) conveyor 180 that is coupled and/or in communication with the third conveyor 160. The fourth conveyor 180 may be configured to receive the material from the third conveyor 160 and to convey the material in a fourth (e.g., horizontal) direction 182. The fourth direction 182 may be the same as or different from the third direction 162, depending upon the angles at which the arms 150, 170 are oriented. In one embodiment, the material may be transferred from the third conveyor 160 to the fourth conveyor 180 via one or more second slewing drives (also referred to as slewing gears) 184.

The system 100 may also include a loading spout 190 that is coupled to and/or in communication with the fourth conveyor 180. The loading spout 190 may be located proximate to a second end of the second arm 170. The material may be configured to flow from the fourth conveyor 180, through the loading spout 190, and into the top of a silo at a wellsite. In one embodiment, the loading spout 190 may be configured to telescope (e.g., vertically) to extend toward and/or away from the inlet of the silo.

Figure 2:
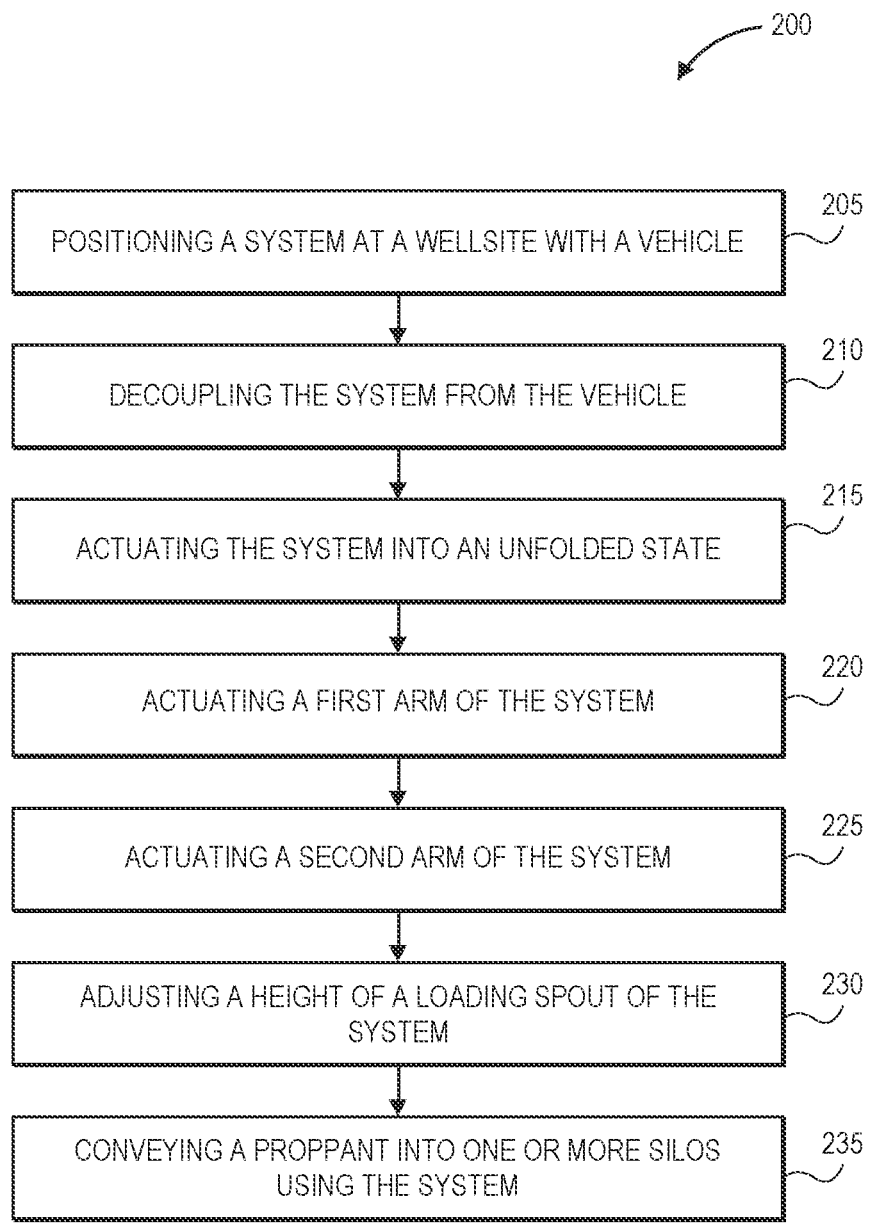
FIG. 2 illustrates a flowchart of a method for loading proppant into a silo (e.g., using the system), according to an embodiment.

FIG. 2 illustrates a flowchart of a method 200 for loading the proppant into a silo, according to an embodiment. An illustrative order of the method 200 is provided below; however, one or more steps of the method 200 may be performed in a different order, simultaneously, repeated, or omitted.

Figure 3A:
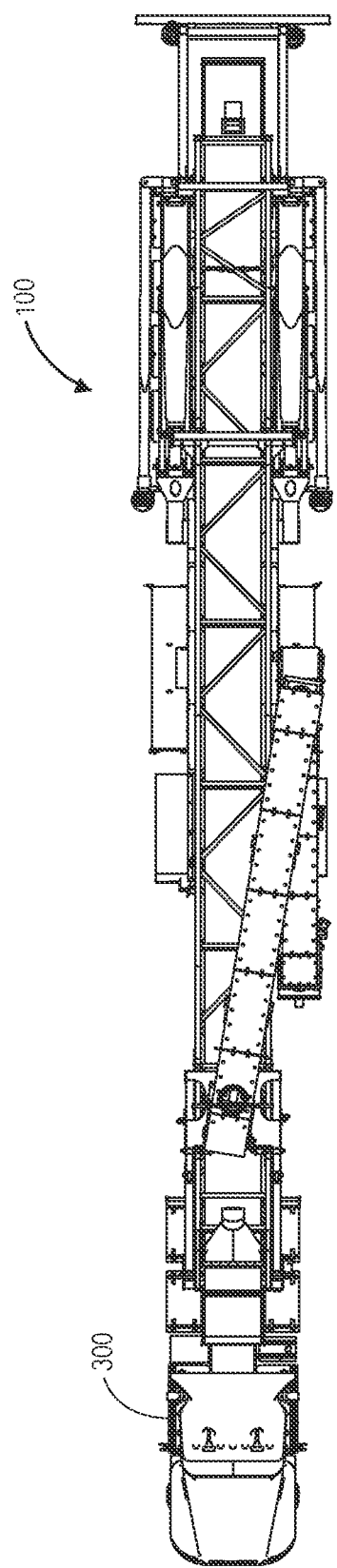
FIGS. 3A and 3B illustrate a top view and a side view of the system coupled to a vehicle and in a folded state, according to an embodiment.
Figure 3B:
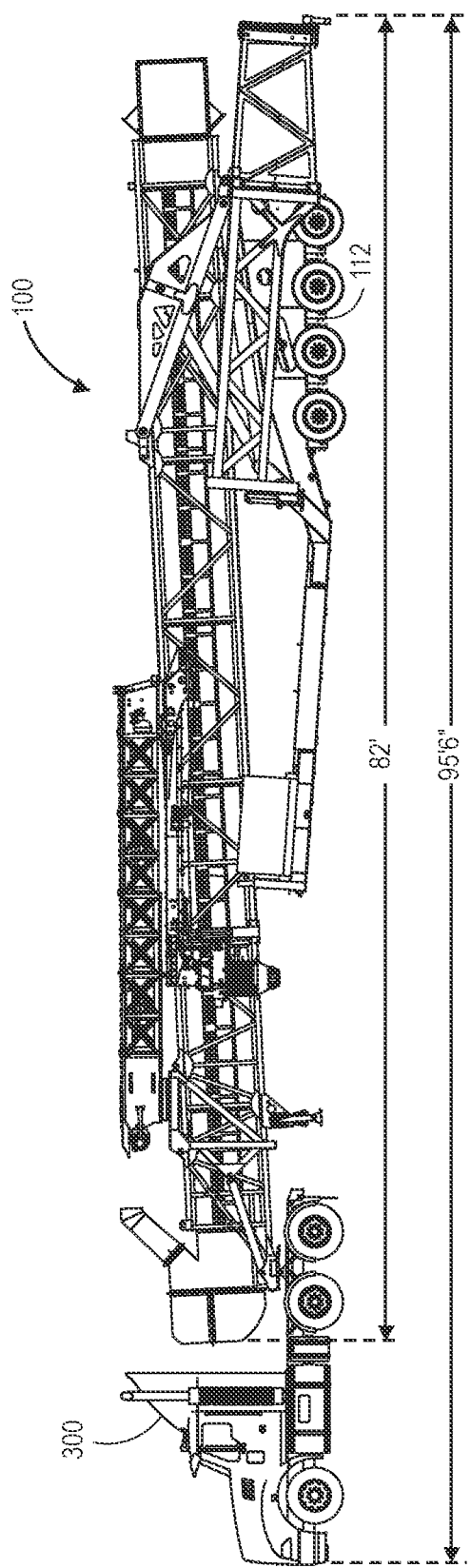

The method 200 may include positioning the system 100 at a wellsite, as at 205. The system 100 may be coupled to and/or positioned by a vehicle 300, as shown in FIGS. 3A and 3B. Thus, the system 100 may be of a weight and size that allows the system 100 to be transported by road. The system 100 may be in a first (e.g., folded) state when the system 100 is being moved and/or positioned by the vehicle 300. This may allow the vehicle 300 to position the system 100 at any location and/or orientation at the wellsite. The derrick 130 may be substantially horizontal when the system 100 is in the folded state. In the folded state, the system 100 may have a length from about 40 feet to about 80 feet or about 60 feet to about 80 feet and a height from about 8 feet to about 16 feet or about 10 feet to about 14 feet. In contrast, conventional belt conveyors have a length of greater than or equal to about 120 feet.

Figure 4:
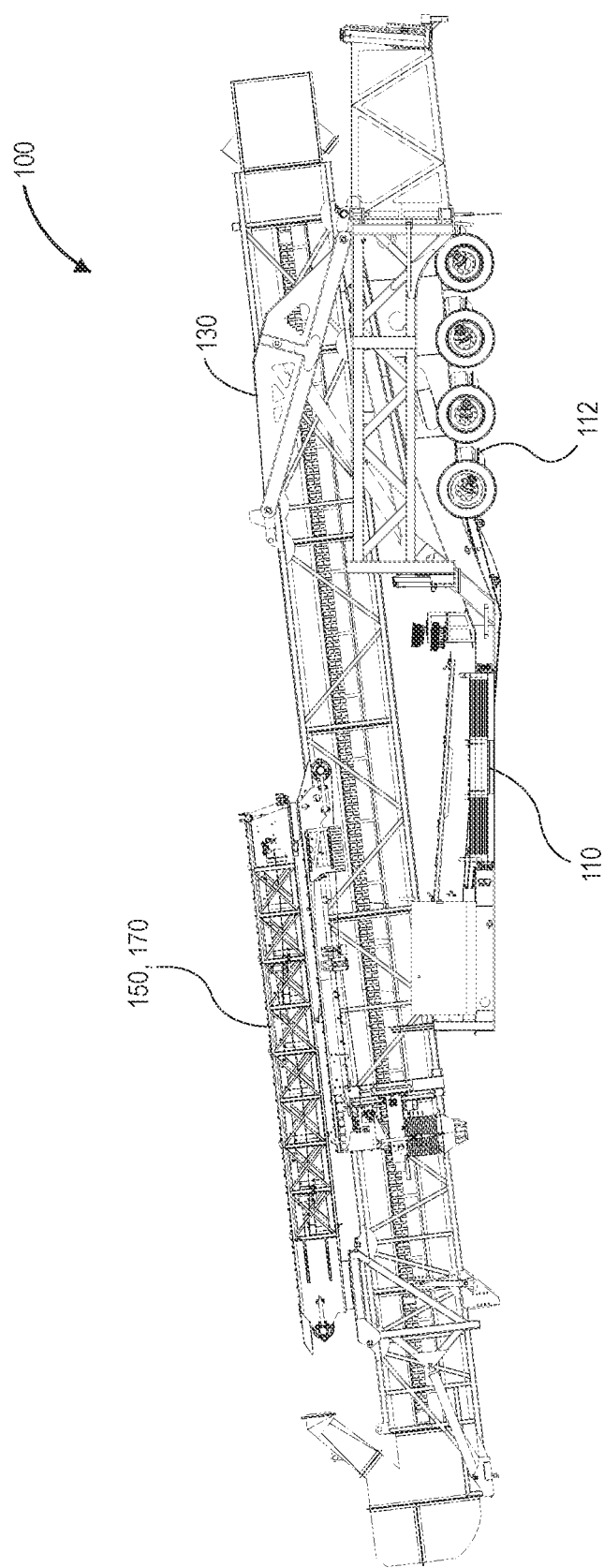
FIG. 4 illustrates a side view of the system after being decoupled from the vehicle in the folded state, according to an embodiment.

The method 200 may also include decoupling the system 100 from the vehicle 300, as at 210. The system 100 may be decoupled after the system 100 has been positioned at the desired location at the wellsite (e.g., proximate to one or more silos). As shown in FIG. 4, the system 100 may be in the folded state when the system 100 is decoupled from the vehicle 300.

Figure 5:
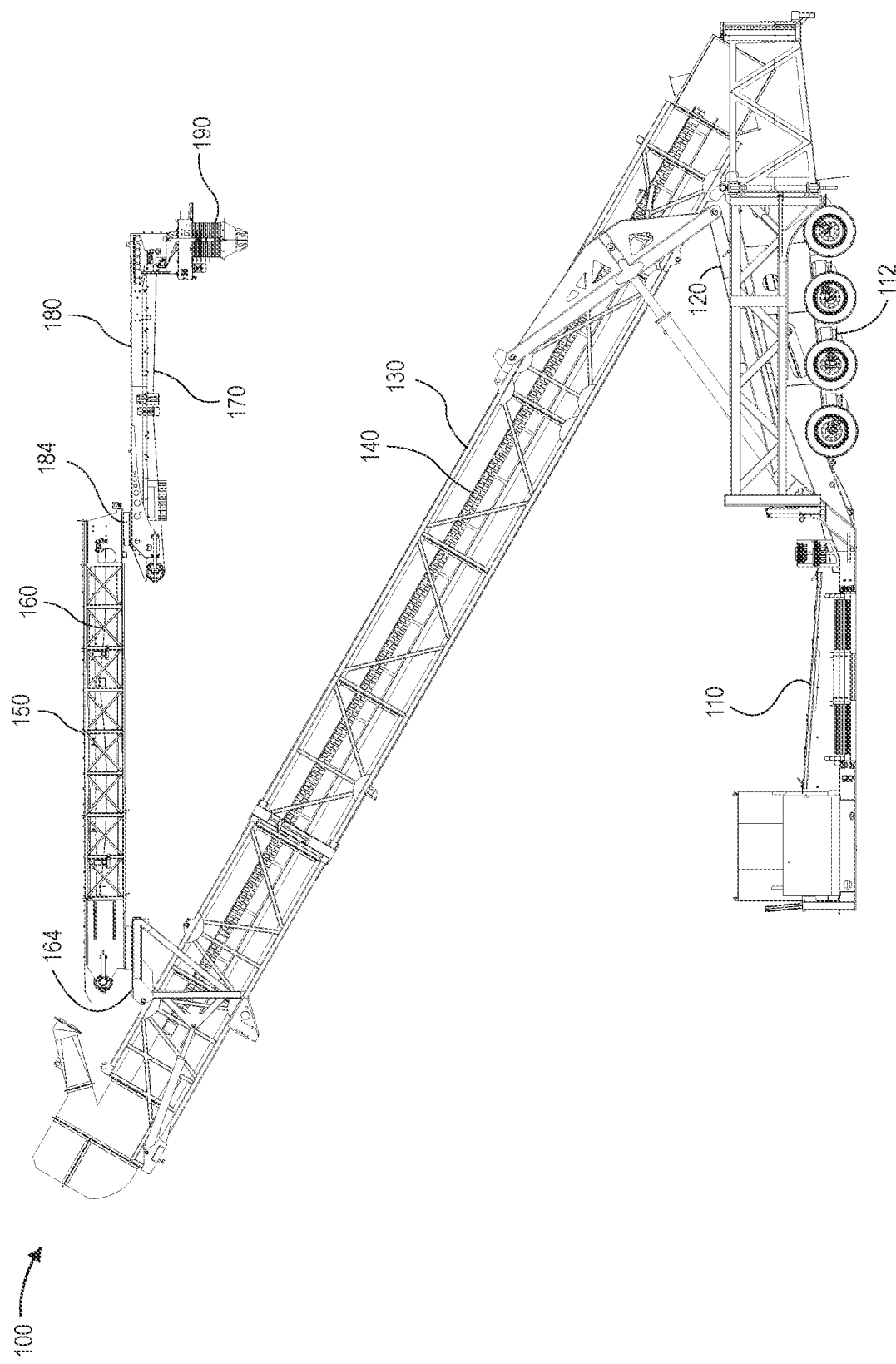
FIG. 5 illustrates a side view of the system in a first partially unfolded state with a derrick oriented at about 30 degrees, according to an embodiment.
Figure 6:
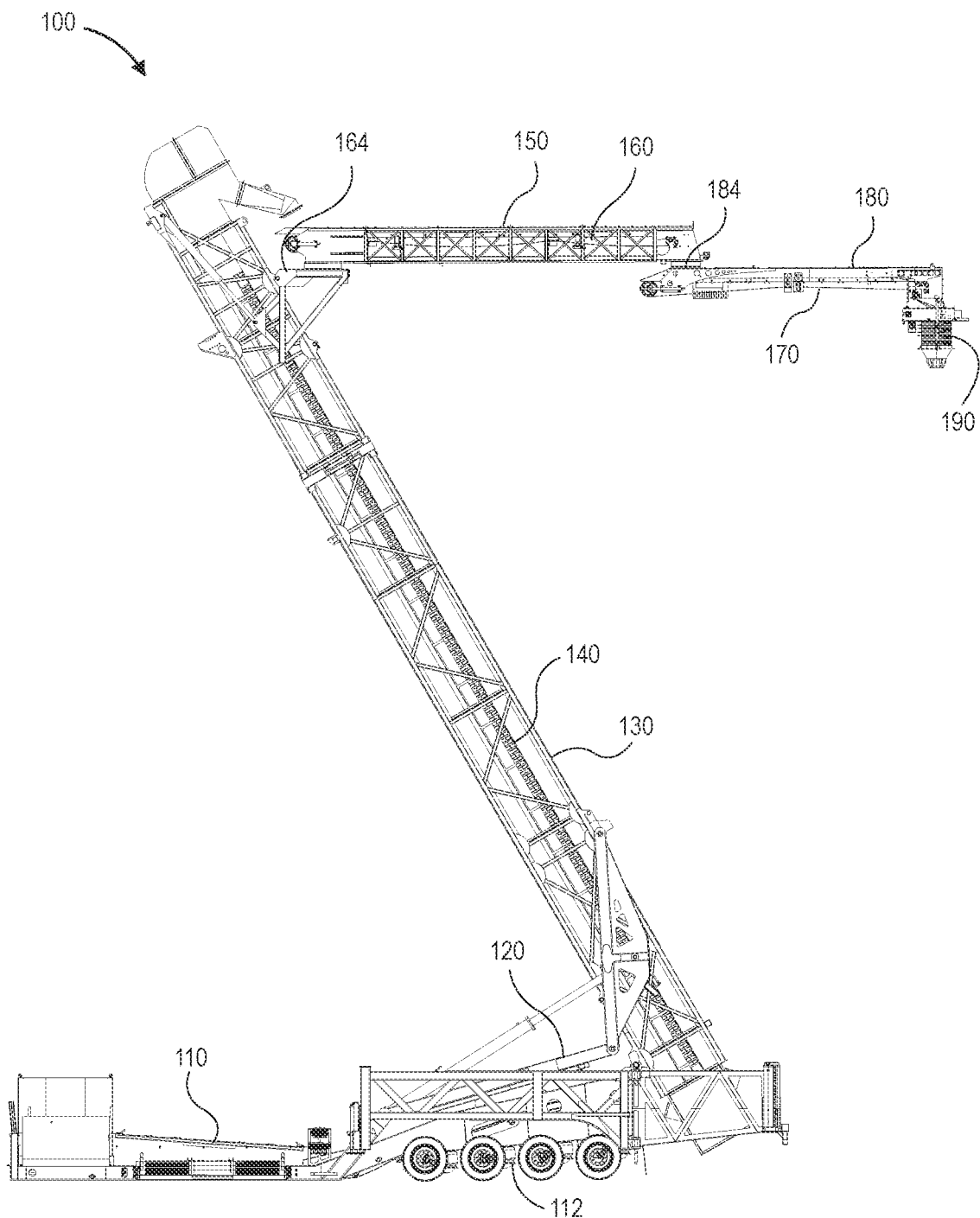
FIG. 6 illustrates a side view of the system in a second partially unfolded state with the derrick oriented at about 60 degrees, according to an embodiment.
Figure 7:
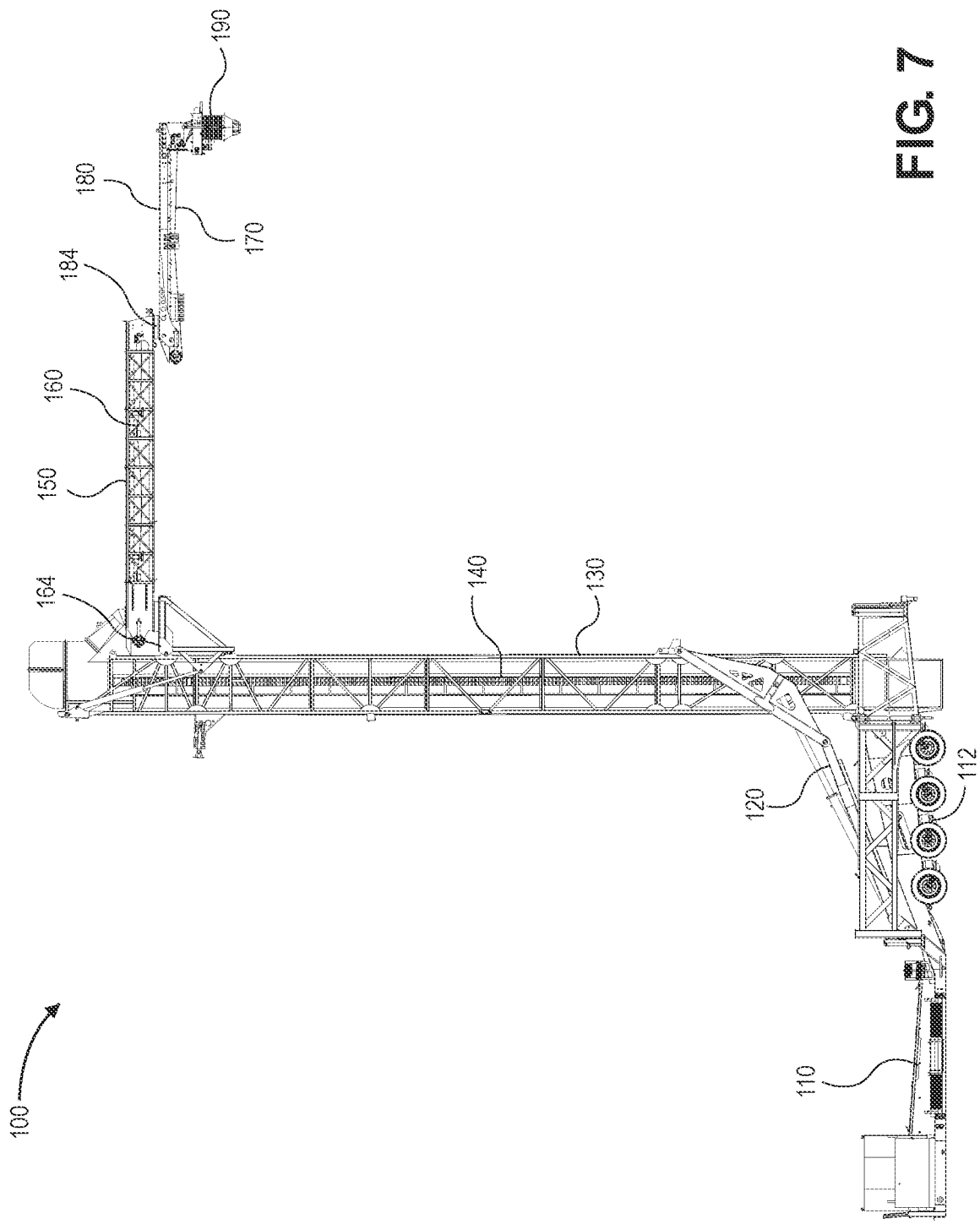
FIG. 7 illustrates a side view of the system in an unfolded state with the derrick oriented at about 90 degrees (e.g., vertical) and an outer arm of the system in a first (e.g., extended) position, according to an embodiment.

The method 200 may also include actuating the system 100 into an unfolded state, as at 215. The system 100 may be actuated into the unfolded state after the system 100 is positioned and/or decoupled. FIG. 5 illustrates the system 100 actuated into a first partially unfolded state (e.g., with the derrick 130 oriented at 30 degrees with respect to the ground), FIG. 6 illustrates the system 100 actuated into a second partially unfolded state (e.g., with the derrick 130 oriented at 60 degrees with respect to the ground), and FIG. 7 illustrates a side view of the system 100 actuated in the unfolded state (e.g., with the derrick 130 oriented at 90 degrees with respect to the ground), according to an embodiment. In contrast, conventional belt conveyors cannot exceed an angle greater than about 15 degrees.

In the embodiment shown, the arms 150, 170 and/or the conveyors 160, 180 may be/remain substantially horizontal as the derrick 130 actuates through an arc from the horizontal position to the vertical position. In another embodiment, the arms 150, 170 and/or the conveyors 160, 180 may be/remain parallel to the derrick 130 as the derrick 130 actuates through the arc from the horizontal position to the vertical position, and then the arms 150, 170 and/or the conveyors 160, 180 may actuate to become substantially horizontal.

The method 200 may also include actuating the first arm 150, as at 220. The first arm 150 may be actuated around a vertical axis that extends through a first end of the first arm 150 that is coupled to the derrick 130. As mentioned above, this may include moving the first arm 150 through an arc in a horizontal plane up to about 270 degrees. The first arm 150 may be actuated when the system 100 is in the partially unfolded state and/or the unfolded state.

The method 200 may also include actuating the second arm 170, as at 225. The second arm 170 may be actuated around a vertical axis that extends through a first end of the second arm 170 that is coupled to the second end of the first arm 150. As mentioned above, this may include moving the second arm 170 through an arc in a horizontal plane up to about 360 degrees. The horizontal plane of the first arm 150 may be above the horizontal plane of the second arm 170. The second arm 150 may be actuated when the system 100 is in the partially unfolded state and/or the unfolded state. The second arm 170 may be actuated before, simultaneously with, or after the first arm 150 is actuated.

Figure 8:
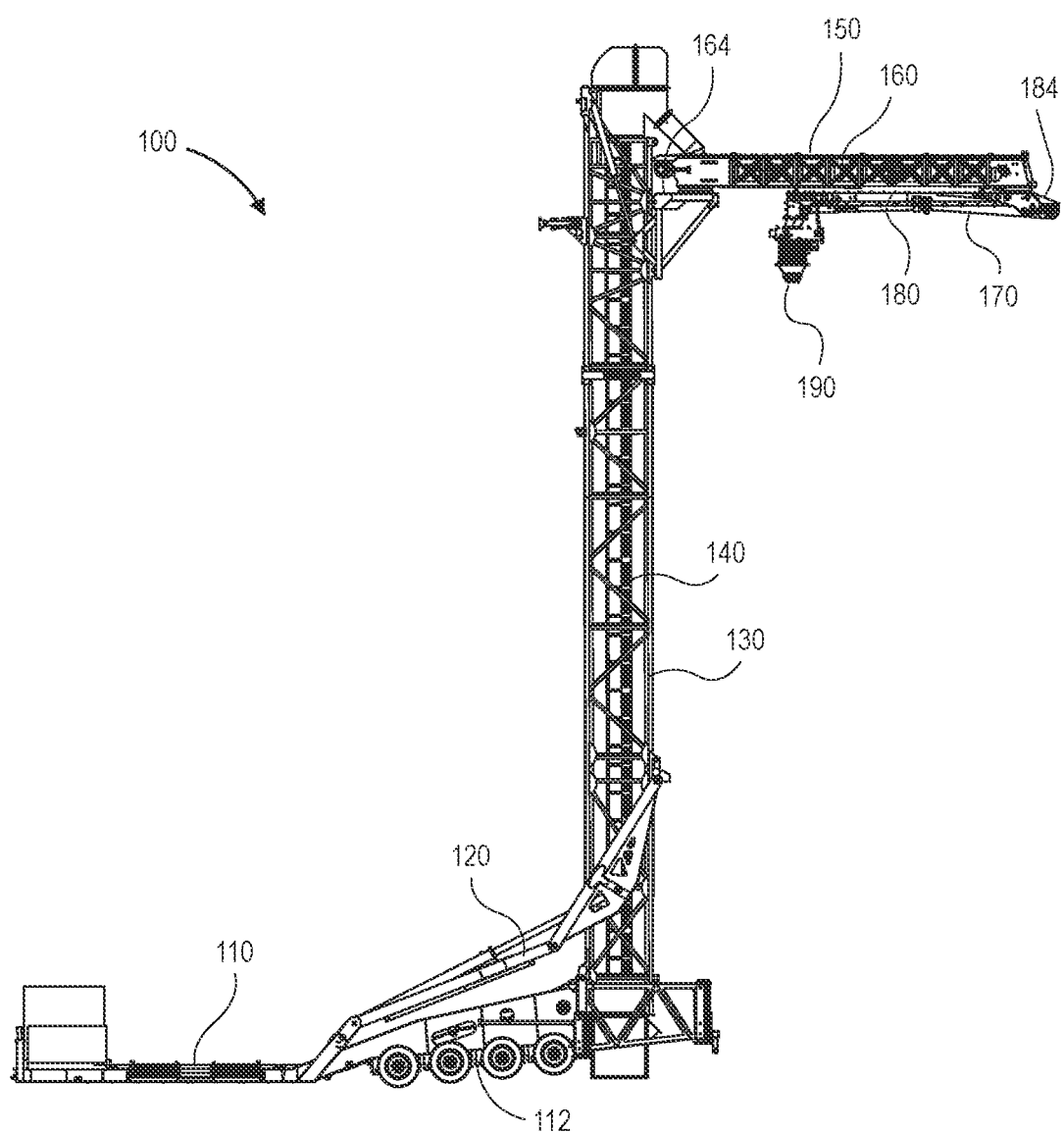
FIG. 8 illustrates a side view of the system in the unfolded state with the outer arm in a second (e.g., retracted) position, according to an embodiment.

In the embodiment shown, the first and second arms 150, 170 are substantially parallel with one another as the as the system 100 actuates from the folded state (e.g., FIG. 4) into the unfolded state (e.g., FIG. 7). More particularly, the second arm 170 is in a first (e.g., extended) position such that the second end of the second arm 170 is not positioned under the first arm 150, and a total (e.g., horizontal) distance between the derrick 130 and the loading spout 190 is maximized. In another embodiment, the second arm 170 may be in a second (e.g., retracted) position as the as the system 100 actuates from the folded state into the unfolded state, as shown in FIG. 8. In the retracted position, the second arm 170 is positioned under the first arm 150, and the total (e.g., horizontal) distance between the derrick 130 and the loading spout 190 is minimized. In yet another embodiment, the second arm 170 may be configured to actuate between the extended and retracted positions while the system 100 is actuating. In yet another embodiment, the second arm 170 may be configured to actuate between the extended and retracted positions once the system 100 is in the unfolded state.

Figure 9:
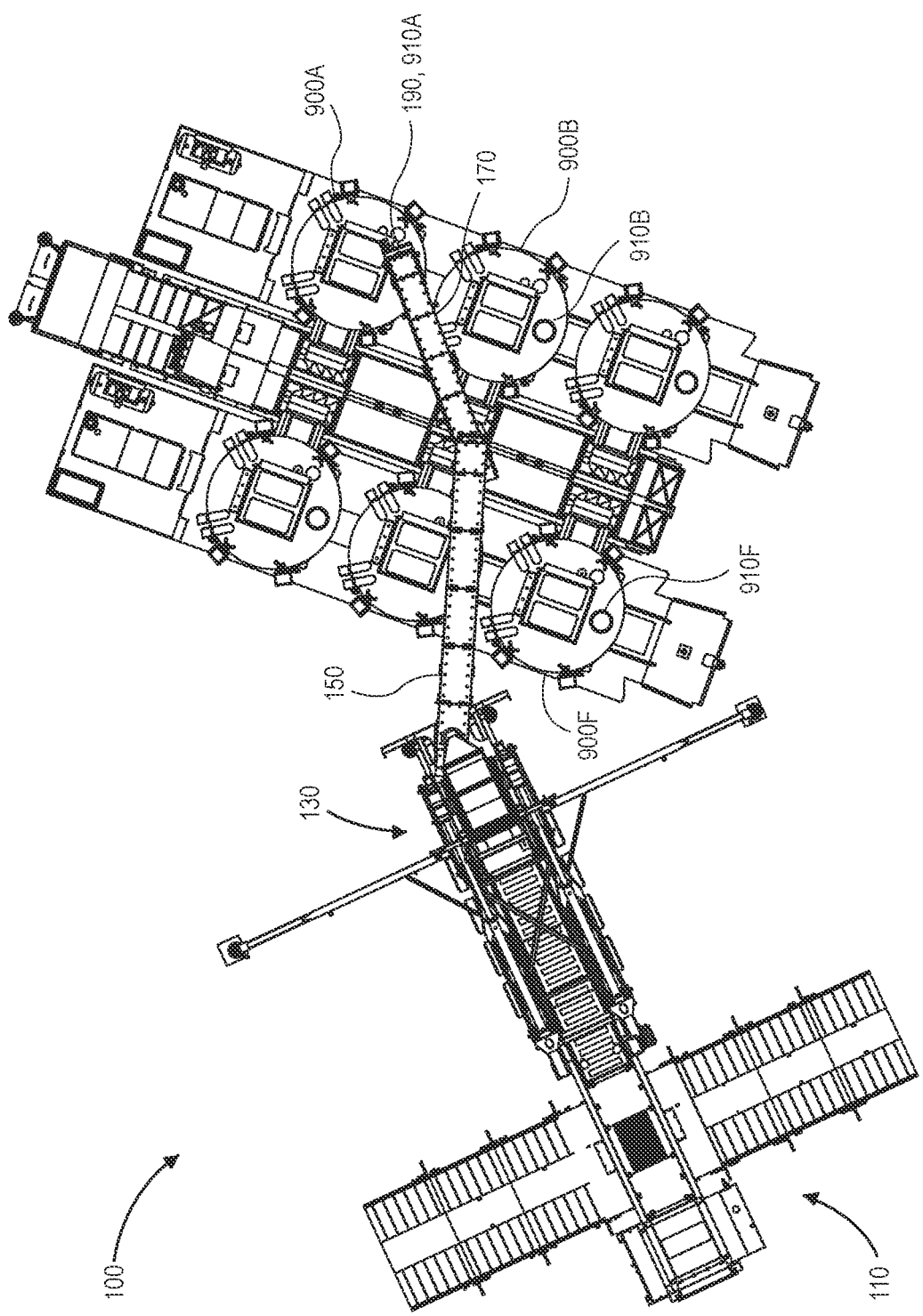
FIG. 9 illustrates a top view of the system in the unfolded state with the outer conveyor positioned over one or more silos, according to an embodiment.

The first arm 150 and/or the second arm 170 may be actuated to align the loading spout 190 with a silo. FIG. 9 illustrates a top view of the system 100 in the unfolded state with the loading spout 190 positioned over one or more silos 900A-900F, according to an embodiment. More particularly, the arms 150, 170 have been actuated to place the loading spout 190 over an inlet 910A of the silo 900A. In one embodiment, the system 100 may include one or more encoders that allow the arms 150, 170 and/or the loading spout 190 to move from silo (e.g., silo 900A) to silo 900B-900F.

The method 200 may also include adjusting a height of the loading spout 190, as at 230. The height of the loading spout 190 may be adjusted with respect to inlet 910A of the silo 900A. More particularly, the height may be adjusted to insert the loading spout 190 at least partially into the inlet 910A of the silo 900A. The height may be adjusted by telescoping the loading spout 190 (e.g., downwards toward the inlet 910A). The height may also or instead be adjusted by adjusting the angle of the derrick 130 with respect to the ground.

The method 200 may also include conveying the material (e.g., proppant), as at 235. The proppant may be conveyed when the system 100 is in the unfolded state. The proppant may be conveyed from the first conveyor 120 on the base 110, to the second conveyor 140 on the derrick 130, to the third conveyor 160 on the first arm 150, to the fourth conveyor 180 on the second arm 170, through the loading spout 190, and into the inlet 910A of the silo 900A. In an embodiment, the proppant may be conveyed through independent operation of each conveyor's rate so as to deliver the proppant consistently and without interruption.

Once the silo 900A is full, the method 200 may loop back around (e.g., to step 215, 220, 225, and/or 230). For example, the height of the loading spout 190 may be adjusted to withdraw the loading spout 190 from the inlet 910A of the silo 900A. Then, the arms 150, 170 may be actuated to align the loading spout 190 with an inlet 910B of a different (e.g., empty) silo 900B. Then, the height of the loading spout 190 may be adjusted to insert the loading spout 190 into the inlet 910B of the silo 900B. Then, the proppant may be conveyed into the silo 900B. This process may repeat to fill additional silos 900A-900F.

In an embodiment, the silos 900A-900F may be filled using the system 100 while the base 110 remains stationary. The system 100 may convey the proppant at a rate from about 2,000 pounds (lbs) per minute to about 20,000 lbs per minute or from about 5,000 lbs per minute to about 15,000 lbs per minute. In contrast, conventional pneumatic conveyors may only convey at a rate up to about 1,500 lbs per minute.

Modular Unloader Conveyor

Figure 10:
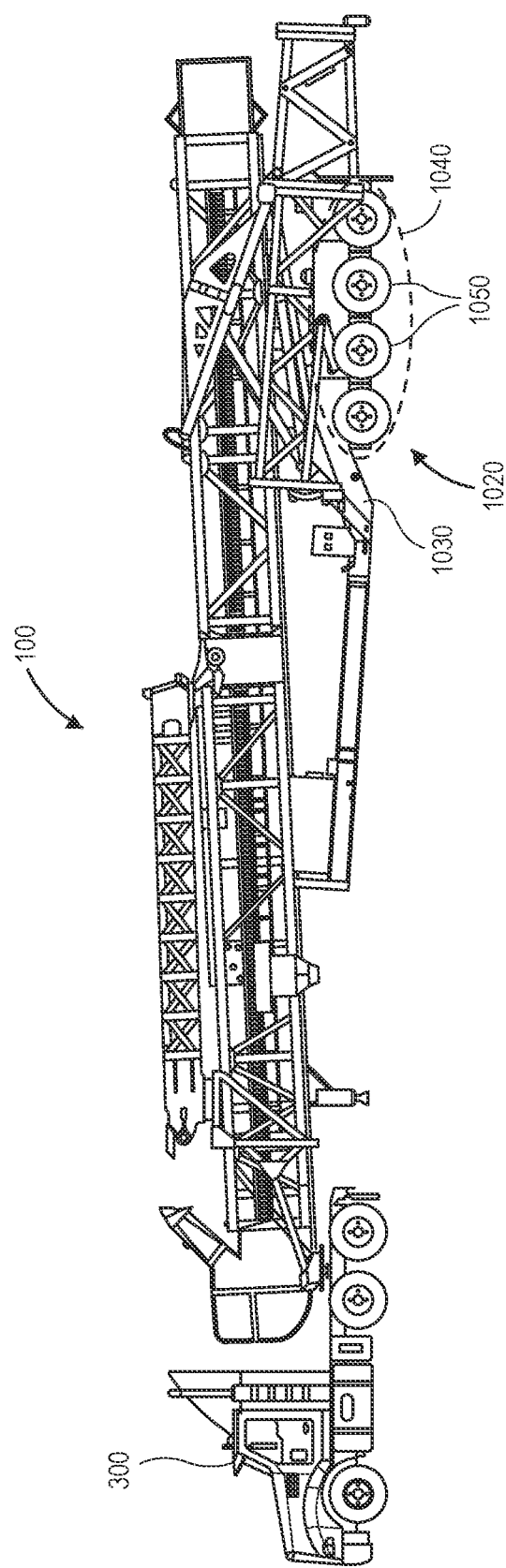
FIG. 10 illustrates a perspective view of a portion of the system (e.g., excluding the first conveyor) on the vehicle, according to an embodiment.
Figure 11:
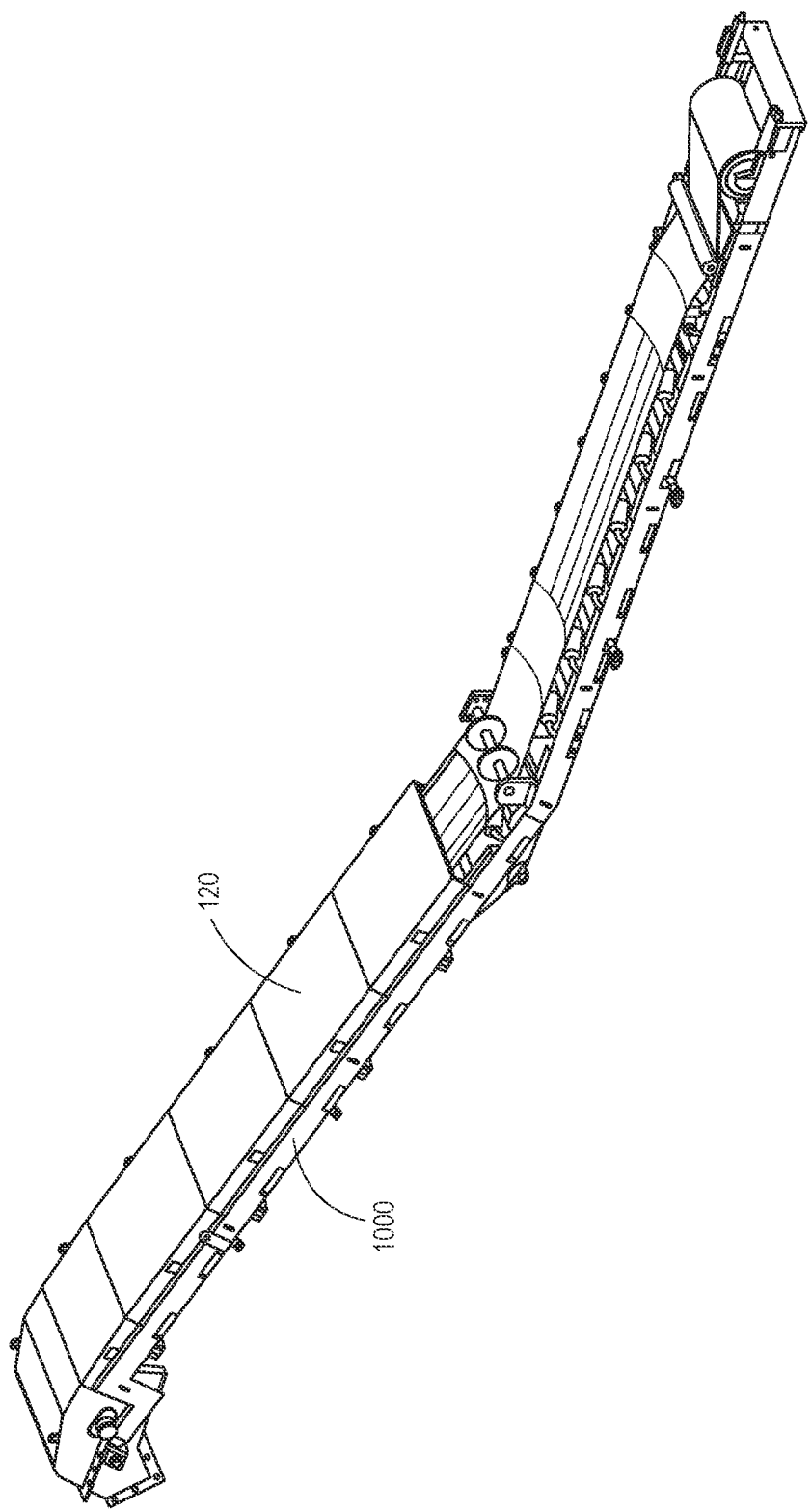
FIG. 11 illustrates the first conveyor separate from the system, according to an embodiment.

FIG. 10 illustrates a perspective view of a portion of the system 100 (e.g., excluding the first conveyor 120) on the vehicle 300, according to an embodiment. FIG. 11 illustrates the first conveyor 120 separate from the system 100, according to an embodiment. As mentioned above, the base 110 of the system 100 may include the truck unloader 112. The truck unloader 112 may include a first portion and a second portion. The first portion may be or include a first mechanical structure 1000 (FIG. 11) that includes or supports the first conveyor 120. The second portion may be or include a second mechanical structure 1020 (FIG. 10) that includes or supports a chassis 1030, suspension 1040, wheels 1050, or a combination thereof. In an embodiment, the chassis 1030, suspension 1040, and/or wheels 1050 may include two or more independent axles (e.g., so that a failure does not completely immobilize the system 100). In addition, the suspension 1040 may be or include an air-ride suspension.

Conventionally, the first and second portions are not modular and are instead integral with one another. Because these portions are integral, the building and/or assembly of the conventional truck unloader occurs sequentially. In other words, the portions cannot be assembled and tested in parallel as separate independent modules. In addition, in the conventional approach, the portions are transported together as a unit (e.g., on the same vehicle-because they are integral with one another). Thus, any damage to the second portion during transportation will likely also be experienced by the first portion.

However, in the truck unloader 112 described herein, the first portion and the second portion may be structurally independent of one another (e.g., modular). This allows the building and/or assembly of the truck unloader 112 to be a parallel process whereby the first portion may be assembled and/or tested before, simultaneously with, or after the second portion is assembled and/or tested. In addition, the first portion (e.g., the first conveyor 120) may be transported, assembled, powered, operated, tested, serviced, and/or repaired without installation into/onto the second portion. For example, the first portion may be transported on a separate vehicle from the rest of the system 100 (e.g., the second portion of the truck unloader 112), and the first and second portions may be removably coupled (e.g., bolted) at the location where the method 200, 1700 is to be performed. Thus, in contrast to conventional truck unloaders, loads experienced by the second portion may not be experienced by the first portion. For example, loads on the chassis 1030 may be transmitted to the suspension 1040 without passing through the first conveyor 120. This may help to prevent the first conveyor 120 from being damaged while being transported. This is particularly useful given the size and length of the unloader and the tendency for conveyor belts to bind when supporting structures that flex under load.

Orifice-Fed Belt

Figure 12:
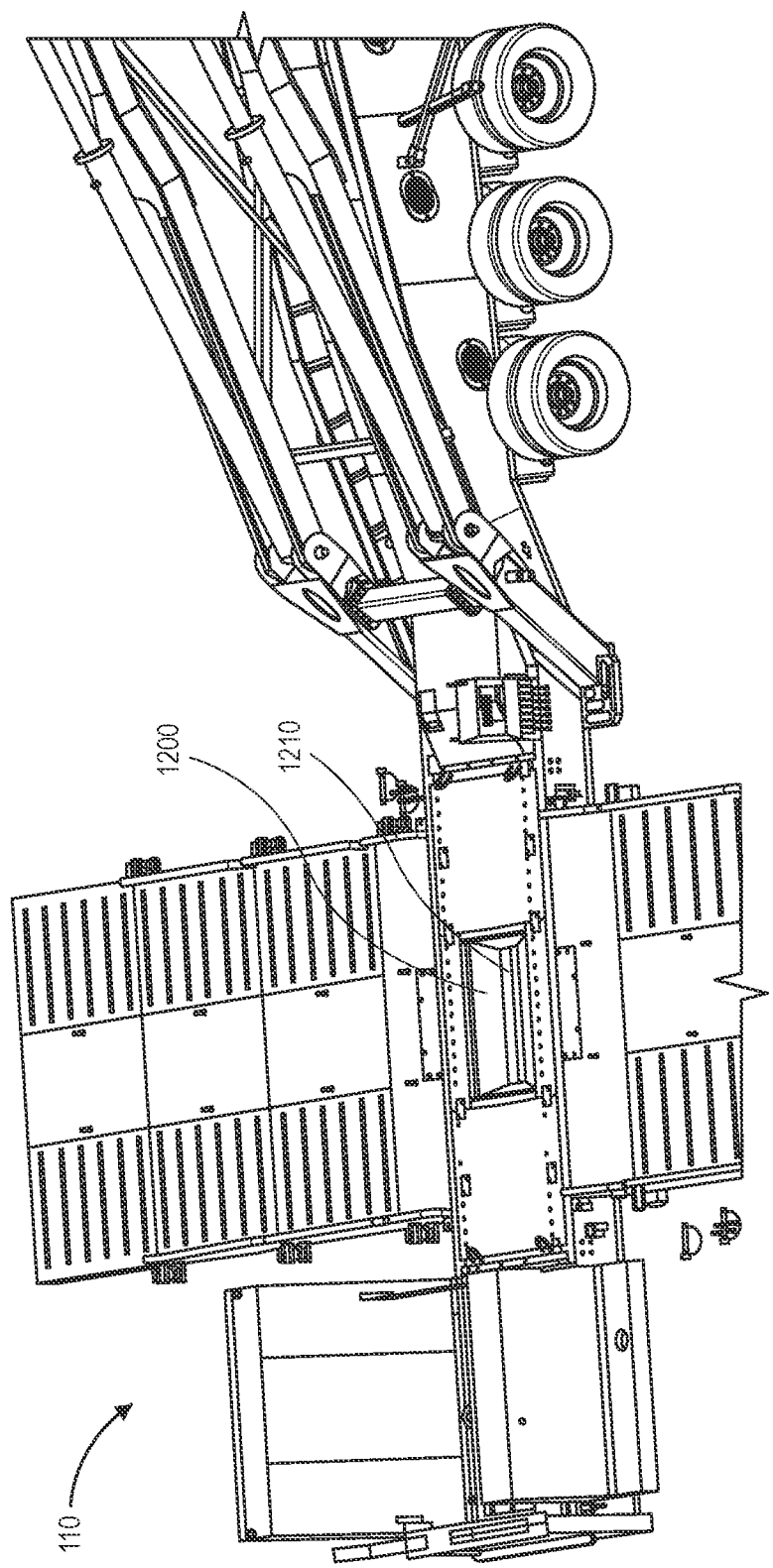
FIG. 12 illustrates a perspective view of a portion of the base of the system showing a funnel having an orifice positioned above the first conveyor (e.g., a trough-style unloading belt), according to an embodiment.
Figure 13:
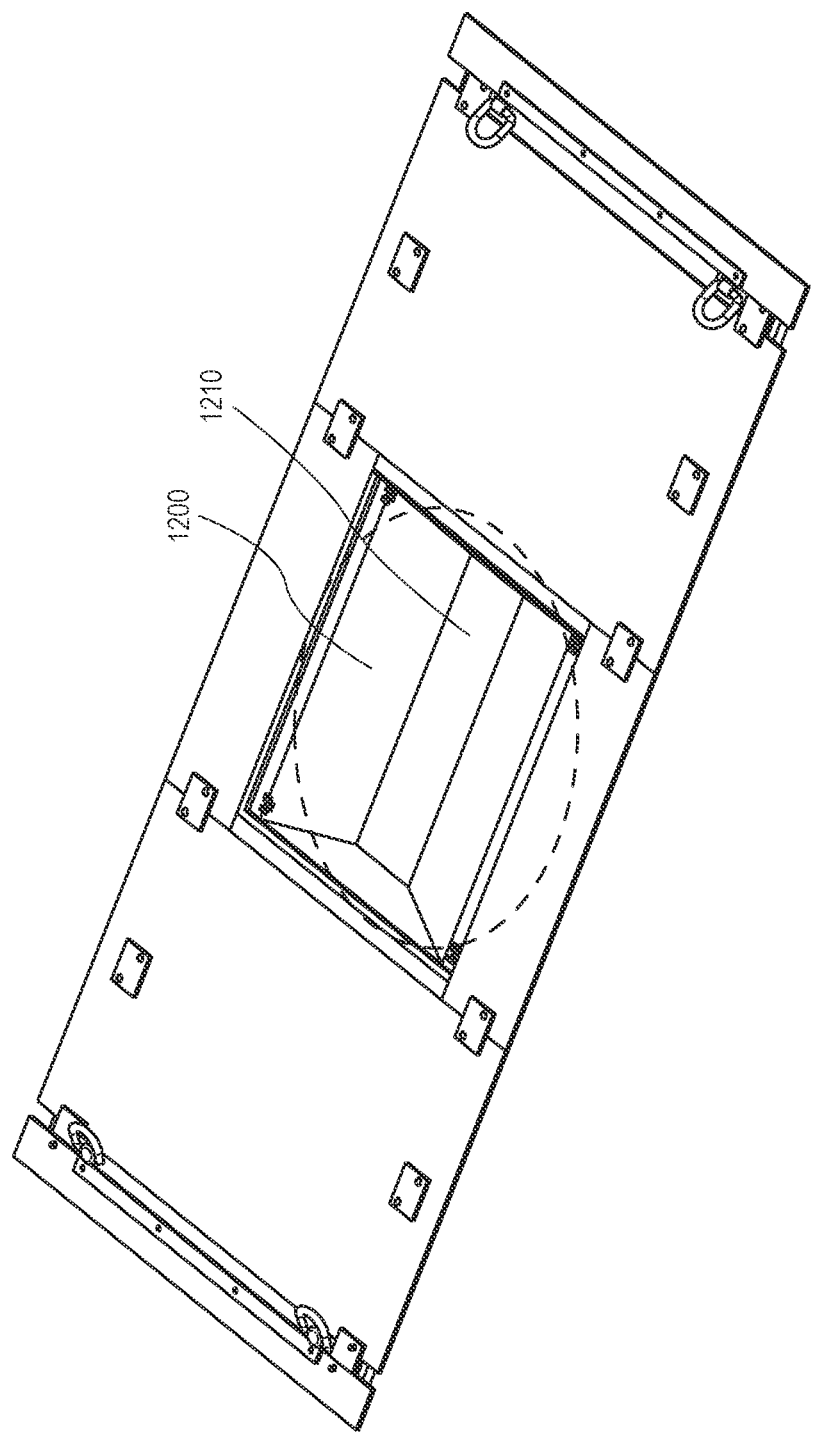
FIG. 13 illustrates an enlarged view of the funnel, according to an embodiment.
Figure 14:
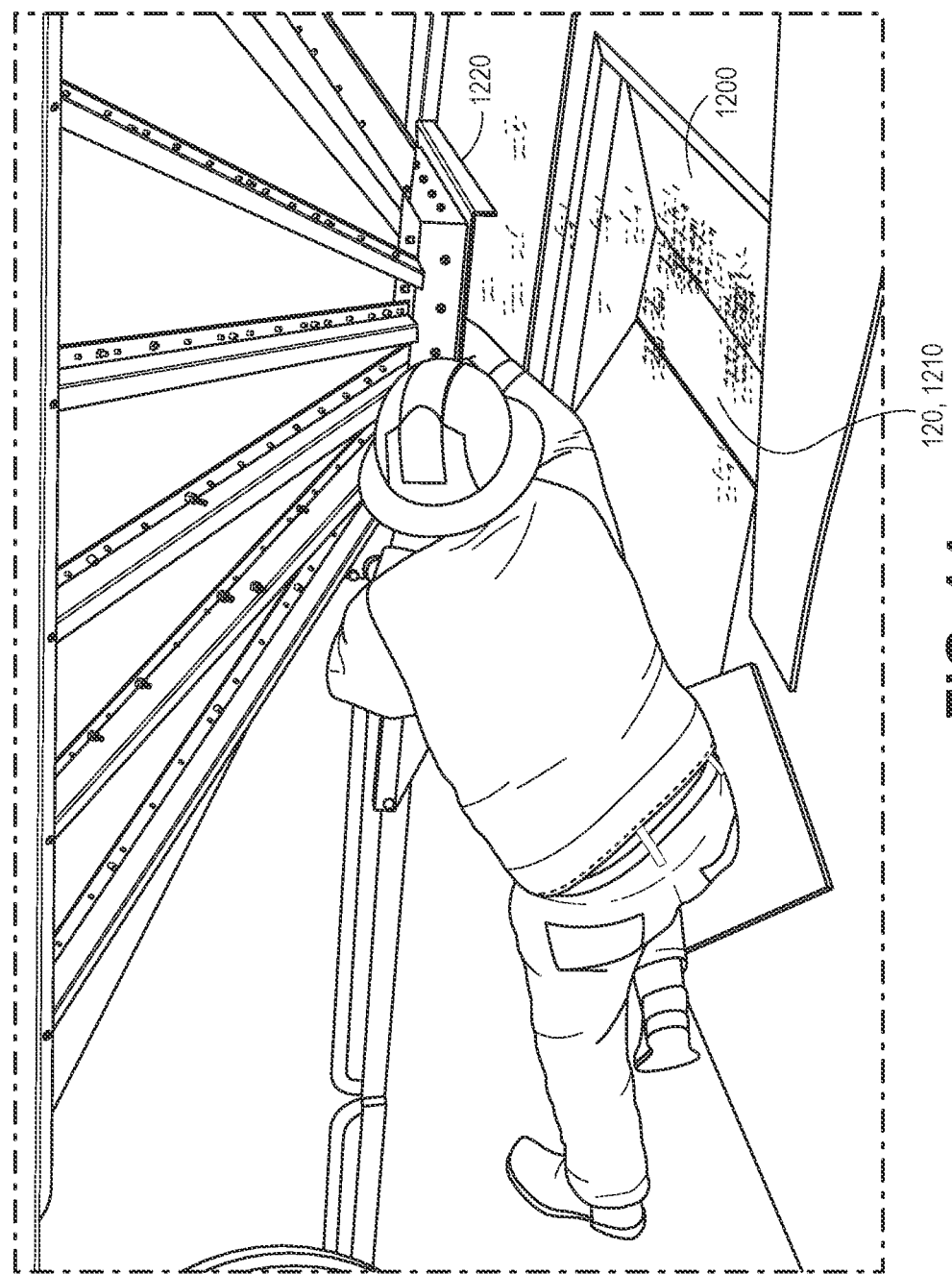
FIG. 14 illustrates a perspective view of a knife gate on a transport truck or trailer positioned above the funnel and the first conveyor of the base, according to an embodiment.

FIG. 12 illustrates a perspective view of a portion of the base 110 of the system 100 showing a funnel 1200 having an orifice 1210 positioned above the first conveyor (e.g., a trough-style unloading belt) 120, according to an embodiment. FIG. 13 illustrates an enlarged view of the funnel 1200, according to an embodiment. FIG. 14 illustrates a perspective view of a knife gate 1220 on a transport truck or trailer positioned above the funnel 1200 and the first conveyor 120 of the base 110, according to an embodiment. The material (e.g., proppant or sand) may flow through the knife gate 1220, through the funnel 1200, and onto the first conveyor 120.

Conventional truck unloaders have a fully exposed belt. As a result, the material is deposited downward through the knife gate 1220 of the transport truck or trailer onto the entire width of the belt. This may cause side and/or eccentric loading on the belt, which is undesirable because it may push the belt to the limit of the pulley and cause damage. The funnel 1200 may serve to center the material onto the first conveyor 120, which may reduce or eliminate the side loading and/or help to ensure belt tracking. For example, the funnel 1200 may cause 100% of the material (e.g., by weight and/or volume) to be positioned within a middle 80%, a middle 90%, or a middle 95% of the width of the first conveyor 120. Thus, less than 20%, less than 10%, or less than 5% of the material may positioned on opposing outer edges of the first conveyor 120. The opposing outer edges each make up about 5%, about 10%, or about 20% of the width of the first conveyor 120. In addition, the loading of the material may be substantially symmetric about a centerline of the first conveyor 120.

In addition, with the conventional setup, the rate at which the material is transferred from the transport truck or trailer onto the belt is regulated by controlling the opening of the knife gate 1220. This is undesirable because it may cause the belt to be under-loaded or over-loaded because, for example, the knife gate 1220 may not be properly calibrated or adjusted. In addition, the positioning of the knife gate 1220 over the belt may load the belt eccentrically. The addition of the funnel 1200 may allow the knife gate 1220 to be opened completely (as opposed to regulated), which may provide the benefit of a consistent uniform loading on the center of the first conveyor 120.

The funnel 1200 may also limit the load on the first conveyor 120. More particularly, the rate at which the material is transferred onto the first conveyor 120 may be controlled by varying the speed of the first conveyor 120. In addition, the load on the first conveyor 120 may be limited to the weight of the material on the first conveyor 120, which enables the first conveyor 120 to be stopped and started without overloading the conveyor motor. This is particularly useful in certain situations, such as when the material's weight varies based on moisture content. In contrast, in a conventional arrangement, the belt load may vary depending upon the opening of the knife gate, which may cause the belt to be inaccurately loaded such that it cannot be started again.

Drum Motor

Figure 15:
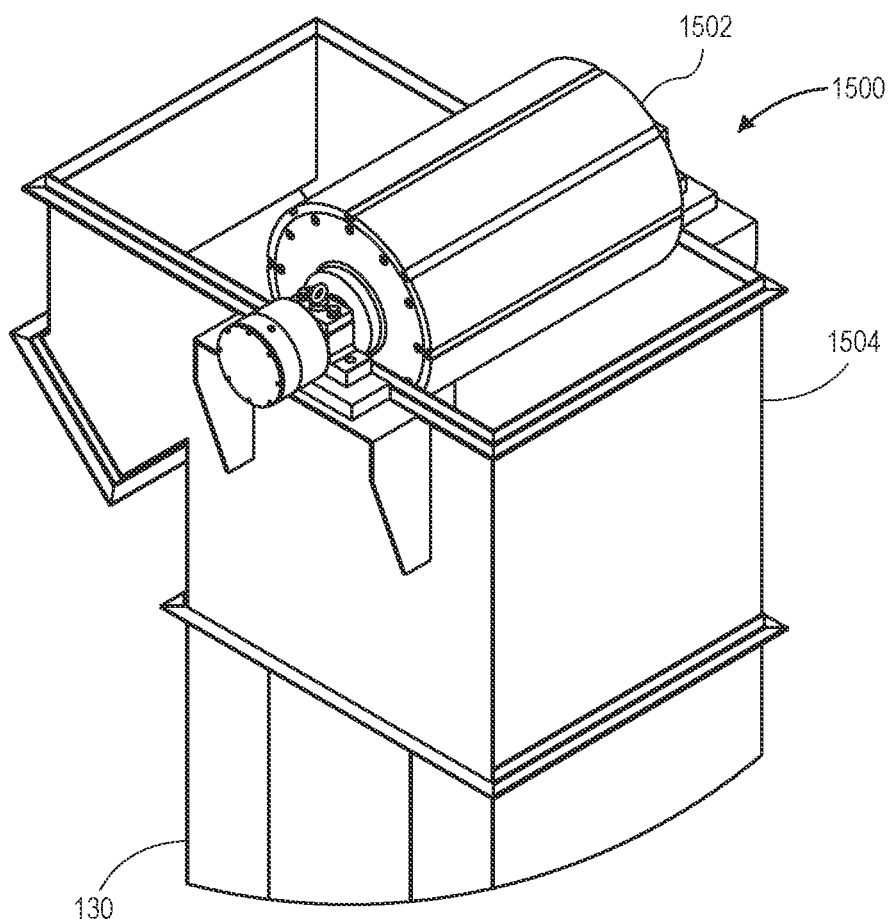
FIG. 15 illustrates an enlarged view of a motorized pulley for the second conveyor positioned proximate to the upper end of the derrick, according to an embodiment.

Conventionally, bucket elevators are powered by an induction motor, a sheave set, a drive belt, and a gear box. Such conventional systems, however, are prone to failure and susceptible to damage from particulates and difficult to service. FIG. 15 illustrates an enlarged view of a portion of the system 100 (e.g., the upper end of the derrick 130 and/or second conveyor 140), according to an embodiment. The (e.g., upper) end of the derrick 130 and/or second conveyor 140 may include a motorized pulley 1500, which may be used to power the second conveyor (e.g., a bucket elevator) 140. The motorized pulley 1500 may be or include a motor 1502 that is used in place of these elements. In one example, the motor 1502 may be or include a drum motor.

The motor 1502 may be at least partially (e.g., entirely) positioned within a shell 1506. The shell 1506 may help to prevent particles (e.g., proppant, dust, etc.) from entering and/or damaging the motor 1502. In contrast, the conventional induction motor is not positioned within an enclosure because it must be positioned external thereto to provide power input to the reducing sheaves and gearbox external to the elevator. As a result, the conventional induction motor is exposed to particles which may damage the motor and/or lead to premature failure.

Figure 16:
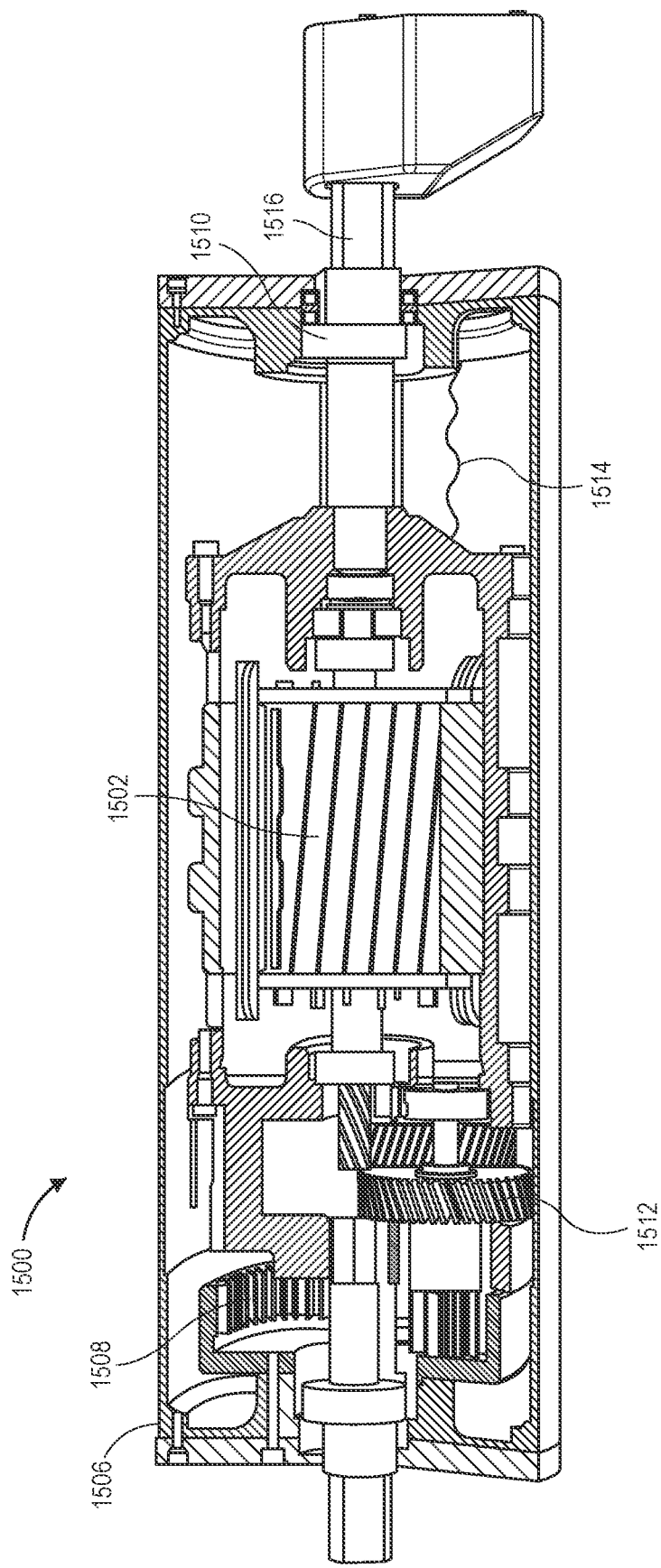
FIG. 16 illustrates a partial cross-sectional view of the motorized pulley for powering the second conveyor, according to an embodiment.

FIG. 16 illustrates a partial cross-sectional view of the motorized pulley 1500, according to an embodiment. As mentioned above, the motorized pulley 1500 may include the motor 1502. In at least one embodiment, the motor 1502 may include be positioned at least partially (e.g., entirely) within a shell 1506. Although not shown, the shell 1506 may be positioned at least partially (e.g., entirely) within the bucket elevator head 1504. The motorized pulley 1500 may also include a planetary gear set 1508 inside the shell 1504 that may provide gear reduction. The motorized pulley 1500 may also include bearings 1510 and gears 1512 inside the shell. The bearings 1510 and/or gears 1512 may be immersed in and/or lubricated by an oil bath 1514. The motorized pulley 1500 may also include a shaft 1516 that does not rotate.

The size of the motorized pulley 1500 may depend at least partially upon the size of the second conveyor 140, or vice versa. For example, to employ the motorized pulley 1500, the second conveyor 140 may be designed to have a length to width (L:W) ratio that allows the motorized pulley 1500 to be of a sufficient size to enclose the motor 1502. For example, the (e.g., minimum) length of the motorized pulley 1500 may be from about 30 inches to about 40 inches or about 35.4 inches to about 37.4 inches, and the width (e.g., minimum diameter) may be from about 22 inches to about 27 inches or about 24 inches to about 25 inches. In an embodiment, the motorized pulley 1500 may be less than 25 inches in length and less than 40 inches in width to be received within the bonnet and/or head roller of the second conveyor 140.

The motorized pulley 1500 may generate 30 horsepower (HP), 40 HP, 50 HP, 60 HP, or 75 HP. The motorized pulley 1500 may be able to cause the second conveyor 140 to raise a predetermined amount of the material (e.g., proppant) a predetermined distance per hour. The predetermined amount may be from about 300 tons to about 600 tons or about 400 tons to about 500 tons, and the predetermined distance may be from about 50 feet to about 100 feet or about 60 feet to about 80 feet.

The (e.g., maximum) length/height of the second conveyor 140 may be based at least partially upon a hanging load of the second conveyor 140 and conveyed material (e.g., proppant) therein. In an example, the (e.g., maximum) length/height may be from about 60 feet to about 100 feet or about 70 feet to about 80 feet. The total hanging load may not exceed the design load capacity of the motorized pulley 1500. As a result, the head roller of the second conveyor 140, when equipped with the motorized pulley 1500, may be larger than conventional head rollers. For example, the head roller may be from about 20 inches to about 32 inches or about 24 inches to about 25 inches. The head roller may be from about 0.1 inches to about 1.0 inch or about 0.3 inches to about 0.7 inches larger than a conventional head roller to accommodate the (e.g., 50 HP) motor 1502 of the motorized pulley 1500.

In an embodiment, the pulling force of the motorized pulley 1500 may be from about 3000 pound feet (lbf) to about 6000 lbf or about 4000 lbf to about 5000 lbf (e.g., 4500 lbf), and the hung load of the second conveyor 140 and material may be from about 8000 lbf to about 14,000 lbf or about 10,000 lbf to about 12,000 lbf (e.g., 11,000 lbf). The total radial load on the motorized pulley 1500 (e.g., in the 50 HP size range) may be from about 12,000 lbf to about 18,000 lbf, or about 15,000 lbf to about 16,000 lbf (e.g., 15,500 lbf). The radial load capacity of the motorized pulley 1500 (e.g., in the 50 HP size range) may be from about 18,000 lbf to about 25,000 (e.g., 22,000 lbf). The length/height of the second conveyor 140 may be selected to be within the predetermined range provided above. If the length/height of the second conveyor 140 is increased beyond this range, the hung load and/or pulling force on the motorized pulley 1500 may also proportionately increase such that a larger pulley size and/or a dimensionally larger second conveyor 140 may be needed, which may not accommodate mobile use.

The use of the motorized pulley 1500 with the second conveyor 140 may reduce or eliminate the external maintenance items from the conventional top drive (e.g., induction motor). With a conventional bucket elevator, the bearings need to be greased about every 400 hours, the oil in the gearbox needs to be changed about every 2500 hours, and the belts need to be tensioned adjusted or replaced on a regular basis. The external service items on a conventional bucket elevator drive are also subject to environmental exposure and particulate contamination which accelerate wear and maintenance. These issues may be eliminated by replacing the conventional induction motor with the motorized pulley 1500. The motorized pulley 1500 only requires oil replacement about every 60,000 hours. As the motorized pulley 1500 is positioned within the housing 1504, there are no external components requiring adjustment or experiencing exposure to a damaging environment. In one embodiment, the motor 1502 may weigh less than conventional (e.g., induction) motors, which is an advantage given that the derrick 130 is raised and lowered.

Skirts/Deflectors

Figure 17A:
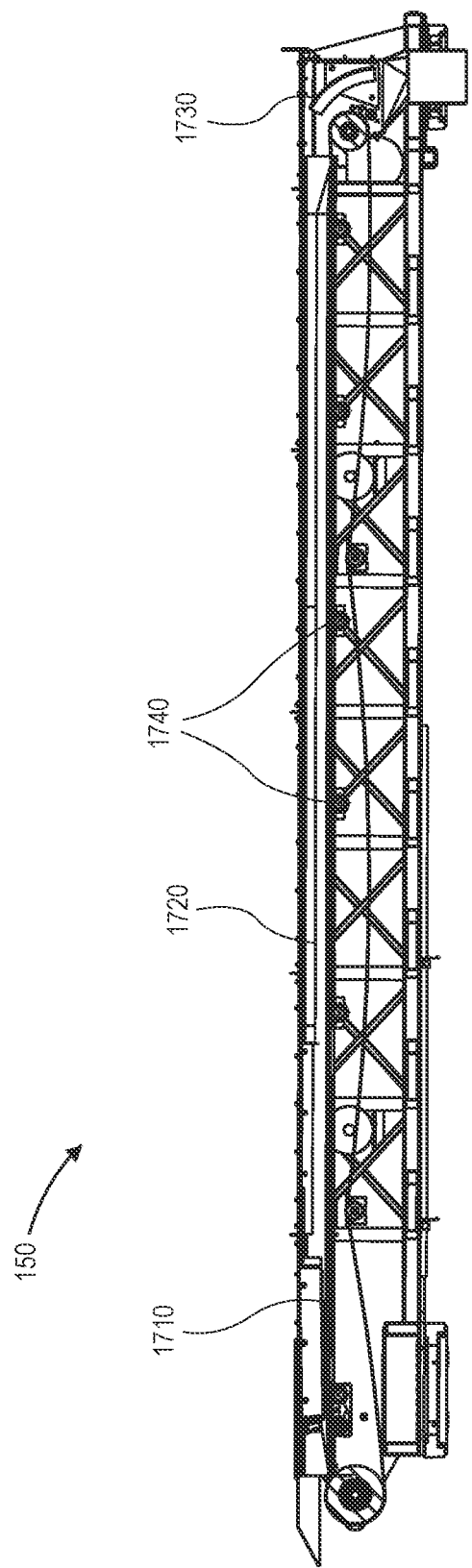
FIG. 17A illustrates a side view of a portion of the system (e.g., the first arm), according to an embodiment.

FIG. 17A illustrates a side view of a portion of the system 100 (e.g., the first arm 150), according to an embodiment. Conventional conveyors do not have any means to keep material on the belt. For example, proppant or sand may enter the conventional conveyors at the system transitions and flow to the outside of the belt, falling over the edge, and being lost to the process. In the system 100, however, an inlet chute 1710 on the first arm 150 and/or the second arm 150 may be configured to centralize the incoming material on the conveyor 160, 180 and maintain this centralization until the material accelerates to the speed of the conveyor 160, 180 and takes on a suitable profile in a middle portion (e.g., two-thirds) of the conveyor 160, 180.

Figure 17B:
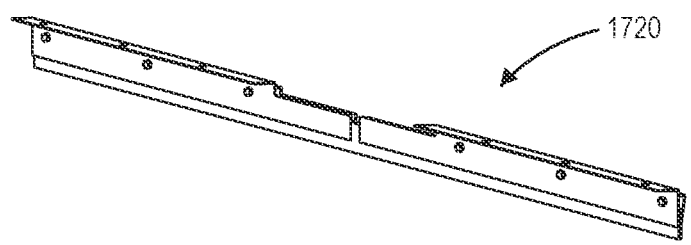
FIG. 17B illustrates an enlarged side view of a skirt in FIG. 17A, according to an embodiment.

The arms 150, 170 may also include one or more skirts 1720. An enlarged view of the skirt 1720 may be seen in FIG. 17B. The skirt(s) 1720 may be positioned downstream from the inlet chute 1710. The skirt(s) 1720 may prevent stray material from flowing outside the conveyor 160, 180 and redirect it to the center of the conveyor 160, 180. The skirt(s) 1720 may also form a barrier to the migration of the material to the edge of the conveyor 160, 180 in the area where the material is accelerating in the direction of the conveyor 160, 180. Once the material reaches the velocity of the conveyor 160, 180, it migrates down the trough to the center of the conveyor 160, 180.

Figure 17C:
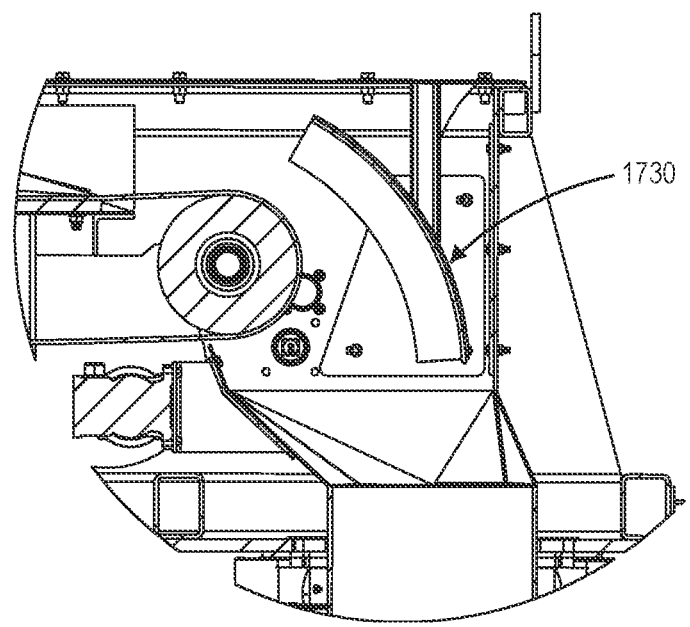
FIG. 17C illustrates an enlarged side view of a deflector in FIG. 17A, according to an embodiment.
Figure 17D:
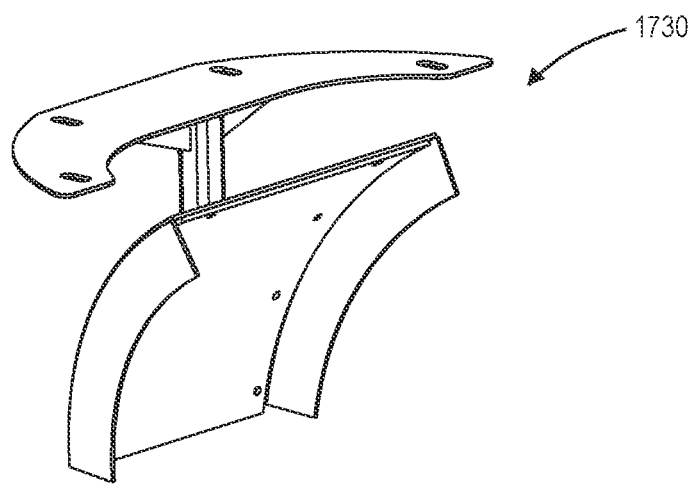
FIG. 17D illustrates a perspective view of the deflector in FIGS. 17A and 17C, according to an embodiment.

The arms 150, 170 may also include one or more deflectors 1730. An enlarged side view of the deflector 1730 may be seen in FIG. 17C, and an enlarged perspective view of the deflector 1730 may be seen in FIG. 17D. The deflector(s) 1730 may be positioned downstream from the skirt(s) 1720. For example, the deflector(s) 1730 may be positioned proximate to a downstream end of the conveyor 160, 180. The deflector(s) 1730 may help to maintain the consolidated stream of material as it enters the conveyor transition. The deflector(s) 1730 may also minimize aeration and/or reduce the generation of dust. The deflector(s) 1730 may also redirect the momentum of the material into the conveyor transition points while maintaining a consolidated stream. The maintenance of the velocity of the material in transition allows the smallest change in the cross section of the material stream reducing the potential of packing off the conveyor 160, 180. Maintaining constancy of the material stream with as little disruption as possible prevents aeration of the material, which limits the generation of dust.

In addition, conventional conveyors use a slider bed made on which the belt slides. The slider bed wears over time, and the friction of the bed wears the belt. This process reduces the service life of the slider bed and the belt. The slider bed is made from a polymer that may melt due the high-temperature of the material (e.g., sand or proppant). In contrast, the system 100 replaces the polymer bed with a roller bed 1740. Replacing the slider bed with one or more rollers reduces or eliminates abrasive wear to the conveyors (i.e., the belts) 160, 180 and the bed. The roller bed does not melt, even when the material is hot.

Ducts

Figure 18:
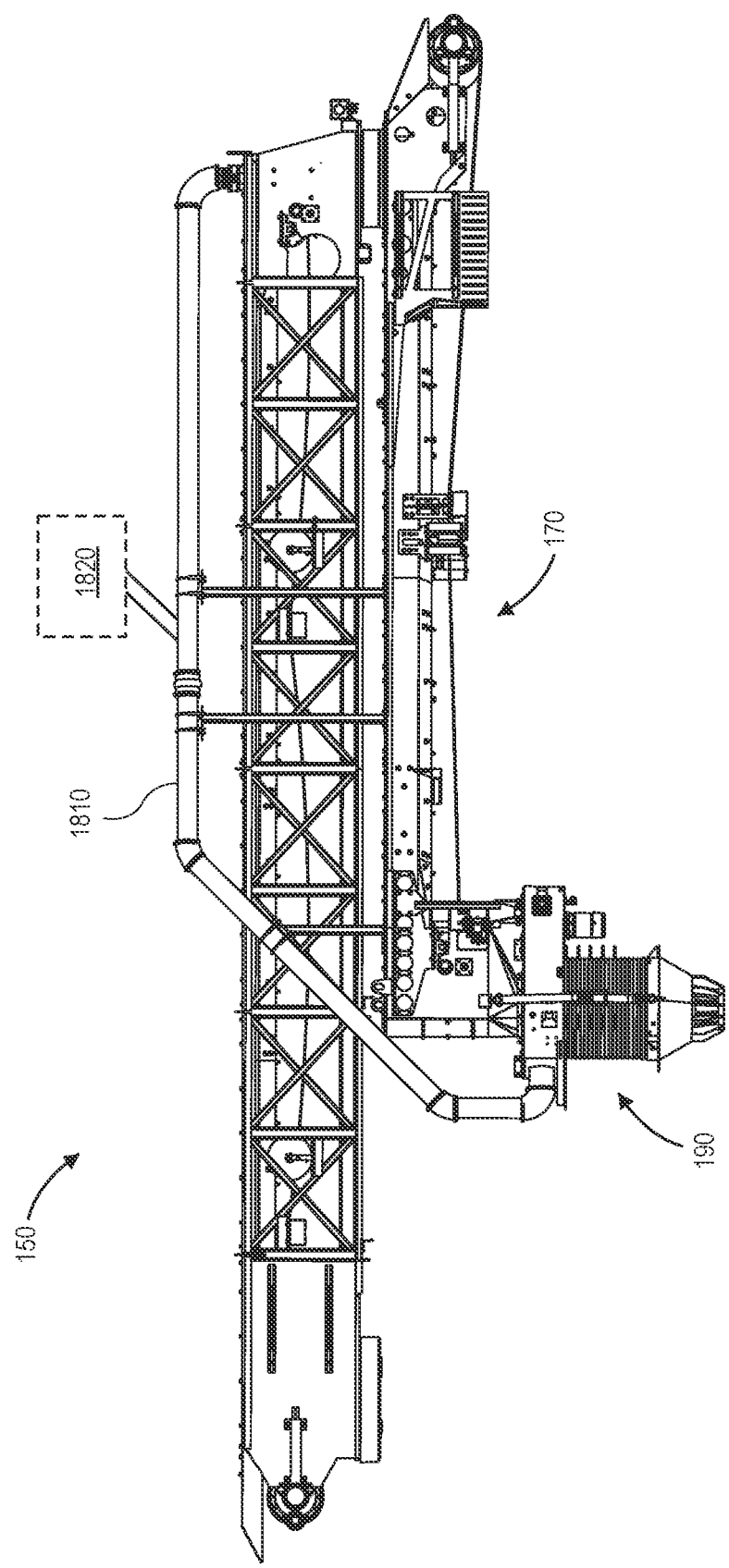
FIG. 18 illustrates a side view of a portion of the system (e.g., the first arm and the second arm), according to an embodiment.

FIG. 18 illustrates a side view of a portion of the system 100 (e.g., the first arm 150 and the second arm 170), according to an embodiment. The system 100 may include one or more duct(s) 1810 that extend to/from the downstream end (i.e., the transition) of the third conveyor 160 and/or the downstream end (i.e., the head) of the fourth conveyor 180. More particularly, a first upstream end of the duct(s) 1810 may be positioned proximate to the downstream end of the third conveyor 160 and/or an upstream end of the fourth conveyor 180. A second upstream end of the duct(s) 1810 may be positioned proximate to the downstream end of the fourth conveyor 180 and/or the loading spout 190.

The system 100 may also include one or more fans 1820 that generate a suction/vacuum force within the duct(s) 1810. In another embodiment, the fan(s) 1820 may be located on or in the silo(s) 910A-910F. For example, the fan(s) 1820 may be attached to a filtration unit on the bag house of the silo(s) 910A-910F. The fan(s) 1820 may draw a vacuum through the telescoping loading spout 190 and the duct(s) 1810. The fan(s) 1820 may pull from about 1000 cubic feet per minute (cfm) to about 5000 cfm (e.g., 3000 cfm) within the duct(s) 1810. The suction force within the duct(s) 1810 may mitigate/remove dust from where the material transitions from the third conveyor 160 to the fourth conveyor 180. It may also or instead mitigate/remove dust from where material transitions from the fourth conveyor 180 and/or the loading spout 190 into the silo(s) 910A-910F.

Vibrators

Oil well stimulation has traditionally been performed with dry sand (e.g., having less than 2% water) as the proppant. The sand may be wet mined and then dried and sieved. The final drying and sieving operation of the sand requires significant additional cost for natural gas and may add an environmental regulatory burden through the production of $CO_2$. Sand that does not go through the drying process (e.g., having a moisture content from 2% to 8%) provides a substantial cost advantage and is functionally the same in that the dry sand is wetted in the fracturing blending process. Dry sand does have advantages in handling. It is a non-bridging material, thus it will flow through any orifice regardless of size and behaves very similarly to a liquid in the handling process. Wet sand is a bridging material and is difficult to remove from storage containers.

Figure 19A:
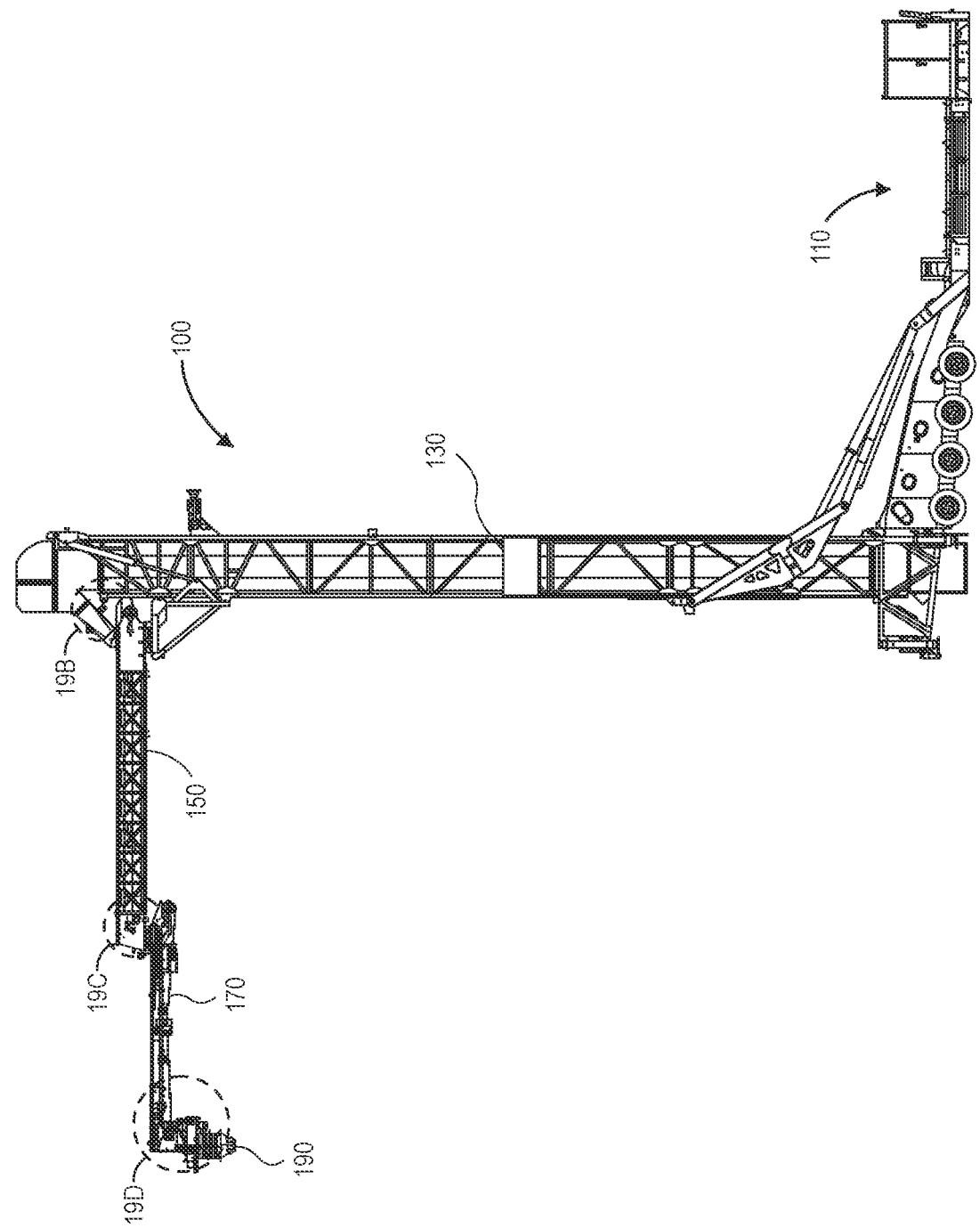
FIG. 19A illustrates a side view of the system in the unfolded state.
Figure 19D:
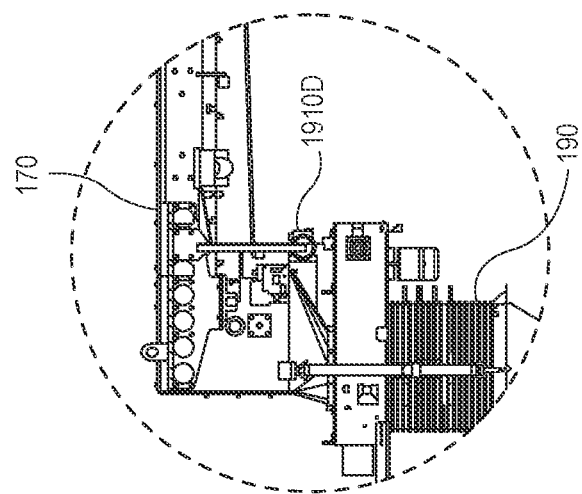
FIGS. 19B-19D illustrate enlarged view of portions of the system.
Figure 19C:
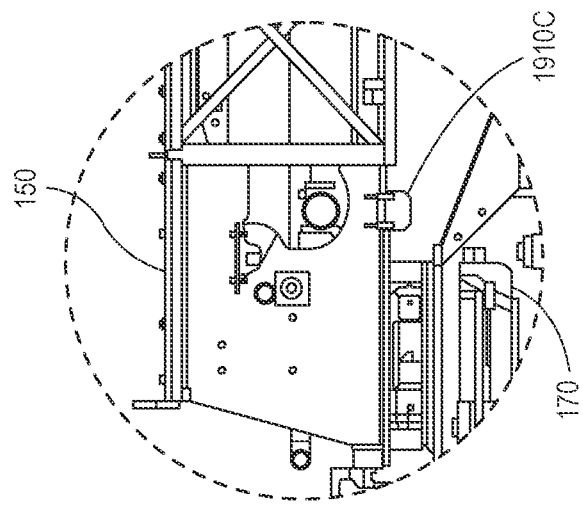
Figure 19B:
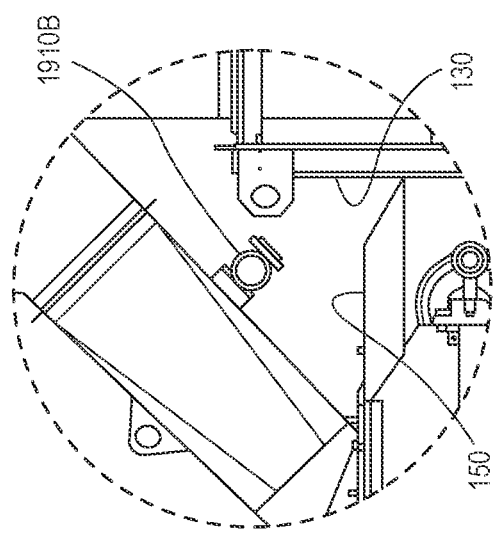

Conventional conveyor systems convey dry sand only. As a result, wet sand does not move easily through the transition sections. Thus, the system 100 may include one or more vibrators at the transition points to enable the flow of wet sand. FIG. 19A illustrates a side view of the system 100 in the unfolded state, and FIGS. 19B-19D illustrate enlarged view of portions of the system 100, according to an embodiment. More particularly, FIG. 19B illustrates a first vibrator 1910B located proximate to an upper end of the derrick 130 (e.g., the second conveyor 140) and/or an inner end of the first arm 150 (e.g., an upstream end of the third conveyor 160). FIG. 19C illustrates a second vibrator 1910C located proximate to an outer end of the first arm 150 (e.g., a downstream end of the third conveyor 160) and/or an inner end of the fourth arm 170 (e.g., an upstream end of the fourth conveyor 180). FIG. 19D illustrates a third vibrator 1910D located proximate to an outer end of the fourth arm 170 (e.g., a downstream end of the fourth conveyor 180) and/or the loading spout 190. The vibrators 1910B-1910D maintain the fluidity of the wet sand as it passes through the transitions so that the wet sand may behave more like dry sand.

The transitions described above may also be internally lined with ultra-high molecular weight (UHMW) materials. UHMW has an extremely low coefficient of friction and a very high water contact angle. This causes saturated materials (e.g., wet sand) to slide off and continue to move through process.

Figure 19E:
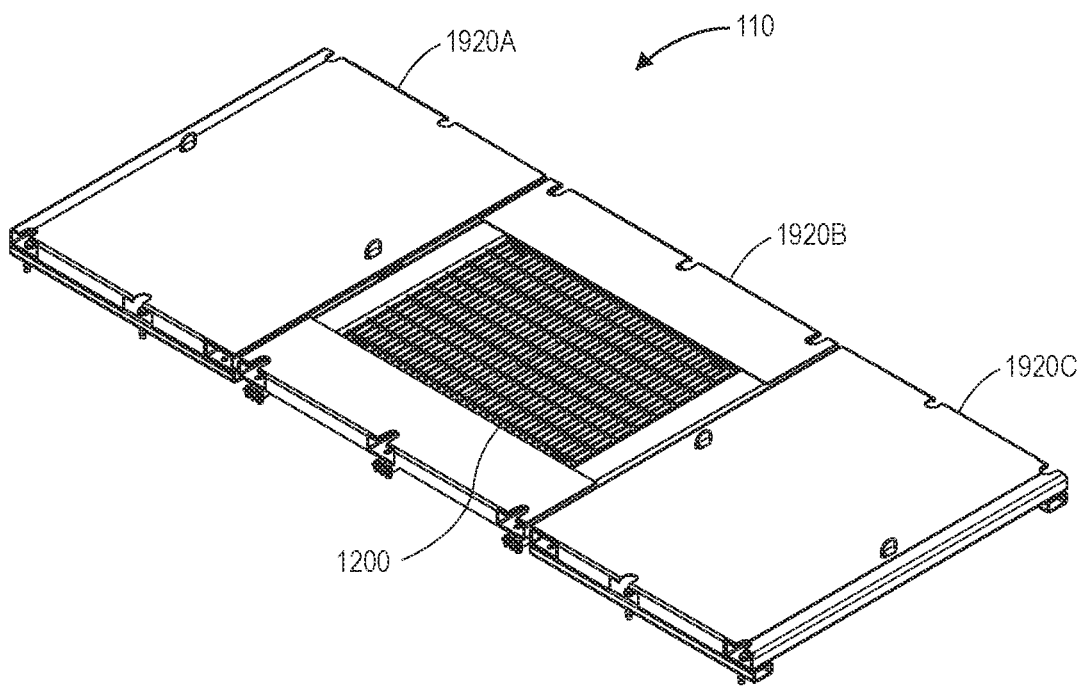
FIG. 19E illustrates an enlarged perspective view of the base of the system.
Figure 19F:
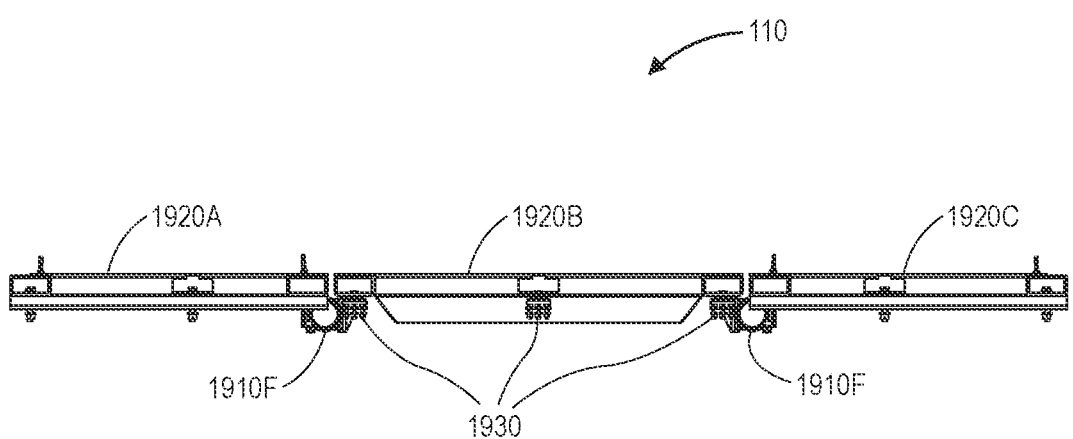
FIG. 19F illustrates a side view of the base, according to an embodiment.

FIG. 19E illustrates an enlarged perspective view of the base 110 of the system 100, and FIG. 19F illustrates a side view of the base 110, according to an embodiment. The drive over deck may be separated into two or more (e.g., three) pieces 1920A-1920C. The center section 1920B including the funnel 1200 may be mounted on isolators 1930. The isolators 1930 may allow the movement of the center section 1920 such that vibration may be imparted into the wet sand by a fourth vibrator 1910F, maintaining fluidity of the product.

Method

Figure 20:
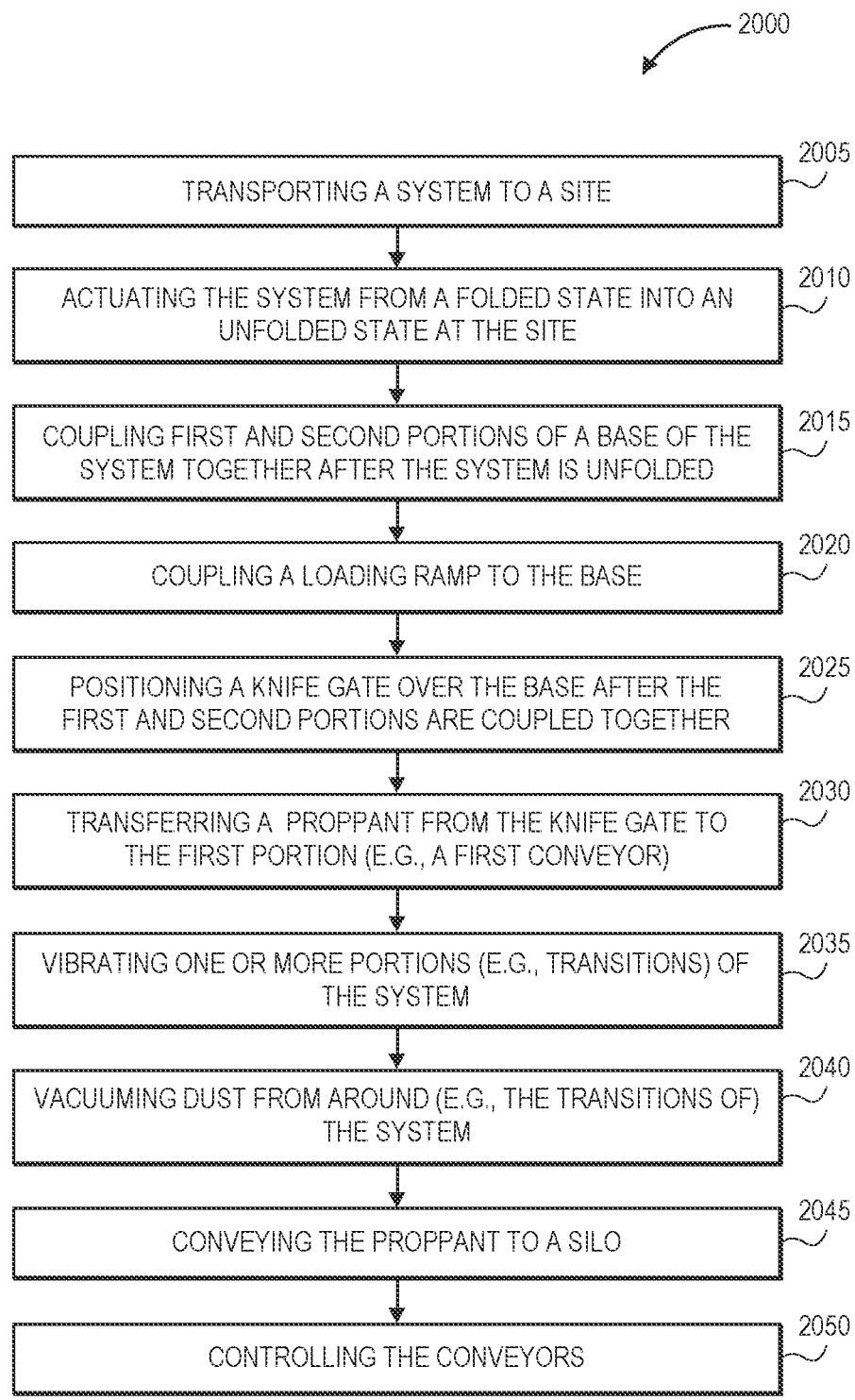
FIG. 20 illustrates a flowchart of another method for loading proppant into a silo (e.g., using the system), according to an embodiment.

FIG. 20 illustrates a flowchart of another method 2000 for loading proppant into a silo (e.g., using the system 100), according to an embodiment. An illustrative order of the method 2000 is provided below; however, one or more steps of the method 2000 may be performed in a different order, simultaneously, repeated, or omitted. The method 2000 may build upon the method 200 described above. Thus, one or more steps of the method 200 may be combined with one or more steps of the method 2000.

The method 2000 may include transporting the system to a site, as at 2005. The system 100 includes the base 110, the derrick 130, the first arm 150, and the second arm 170. The first portion of the base 110 includes the first conveyor 120. The second portion of the base 110 includes the chassis 1030, the suspension 1040, and/or the wheels 1050. The first and second portions of the base 110 may be structurally independent (e.g., decoupled) from one another while the system 100 is being transported. For example, the first portion of the base 110 may be transported on a first vehicle, and the second portion of the base 110 may be transported on a second (e.g., different) vehicle.

In another embodiment, the loading ramps 114 may be structurally independent (e.g., decoupled) from the rest of the system 100 (e.g., the second portion of the base 110) while the system 100 is being transported. For example, the loading ramps 114 may be transported on a different vehicle than the second portion of the base 110.

The method 2000 may also include actuating the system 100 from a folded state into an unfolded state at the site, as at 2010. The derrick 130 may be oriented substantially horizontally when the system 100 is in the folded state, and the derrick 130 may be oriented substantially vertically when the system 100 is in the unfolded state.

The method 2000 may also include coupling the first and second portions of the base 110 together, as at 2015. The first and second portions may be coupled when the system 100 is at the site. The first and second portions may also or instead be coupled when the system 100 is in the folded state and/or the unfolded state.

The method 2000 may also include coupling the loading ramps 114 to the base 110, as at 2020. The loading ramps 114 may be coupled when the system 100 is at the site. The loading ramps 114 may also or instead be coupled when the system 100 is in the folded state and/or the unfolded state.

The method 2000 may also include positioning the knife gate 1220 over the base 110, as at 2025. The knife gate 1220 may be positioned after the first and second portions of the base 110 are coupled together.

The method 2000 may also include transferring the proppant from the knife gate 1220 to the first conveyor 120, as at 2030. Transferring the proppant may include fully opening the knife gate 1220. The proppant may be transferred through the funnel 1200 of the base 110 and onto a middle portion of the first conveyor 120. In an embodiment, less than 20%, less than 10%, or less than 5% of the proppant may positioned on opposing outer edges of the first conveyor 120. The opposing outer edges each make up about 5%, about 10%, or about 20% of a width of the first conveyor 120.

The method 2000 may also include conveying the proppant, as at 2035. The proppant may be conveyed when the system is in the unfolded state. The proppant may be conveyed from the first conveyor 120, to the second conveyor 140 on the derrick 130, to the third conveyor 160 on the first arm 150, to the fourth conveyor 180 on the second arm 170, and into the silo 910A-910F. The second conveyor 140 may be powered by the motorized pulley 1500, which is positioned proximate to the upper end of the derrick 130.

The method 2000 may also include controlling the conveyors 120, 140, 160, 180, as at 2040. A controller of the system 100 may monitor the operation of the first conveyor 120, the second conveyor 140, the third conveyor 160, the fourth conveyor 180, or a combination thereof. More particularly, the controller may measure the amount of electrical current (e.g., amperes) drawn by the drivers of the conveyors 120, 140, 160, 180, such as the motorized pulley 1500 for the second conveyor 140. The controller may also determine whether the electrical currents are within predetermined ranges. For example, if the electrical current drawn by the motorized pulley 1500 reaches or exceeds the upper threshold of its range, then the controller may then reduce the speed of the truck unloader 112 (e.g., the first conveyor 120) to reduce the load(s) on the conveyors 120, 140, 160, 180.

The method 2000 may also include vibrating one or more portions of the system 100, as at 2045. More particularly, the center section 1920B of the base 110 may be vibrated with the vibrator 1910F and/or the transitions may be vibrated with the vibrators 1910B-1910D to facilitate the movement of wet sand. As used herein, "wet" sand has a moisture content from about 2% to about 8% or about 3% to about 10% (e.g., by weight or volume).

The method 2000 may also include vacuuming dust from around the system 100, as at 2050. More particularly, the duct(s) 1810 and the fan(s) 1820 may suction dust from the transitions.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

What is claimed is:

1. A system, comprising:
   a base configured to be positioned on a ground, wherein the base comprises:
      a funnel configured to be positioned under a knife gate; and
      a first conveyor positioned under the funnel, wherein the funnel is configured to direct a material from the knife gate onto a middle portion of the first conveyor;
   a derrick having a first end that is coupled to the base, wherein the derrick comprises:
      a second conveyor configured to receive the material from the first conveyor and to convey the material upward when the system is in an unfolded state; and
      a drum motor positioned proximate to an end of the derrick and configured to provide power to the second conveyor; and
   a first arm having a first end that is coupled to the end of the derrick, wherein the first arm comprises:
      a third conveyor;
      a skirt that directs the material toward a middle portion of the third conveyor; and
      a deflector positioned downstream from the skirt, wherein the deflector consolidates the material as the material enters a transition from the third conveyor to a fourth conveyor, and wherein the deflector also reduces aeration and dust from the material proximate to the transition, wherein the deflector comprises:
         a central portion, wherein the central portion is curved, and wherein the central portion includes a front face and a back face;
         a first sidewall connected to a first side of the central portion, wherein the first sidewall is curved, and wherein the first sidewall extends outward from the front face;
         a second sidewall connected to a second side of the central portion, wherein the second sidewall is curved, and wherein the second sidewall extends outward from the front face;
         a neck connected to the back face of the central portion and extending upward therefrom; and
         a plate connected to an upper end of the neck, wherein the plate is positioned above the central portion, the first sidewall, and the second sidewall, and wherein the plate defines one or more openings therethrough that are configured to receive fasteners to couple the deflector to the system;
   a telescoping loading spout positioned downstream from the third conveyor, wherein the telescoping loading spout is configured to load the material into a silo;
   a duct having at least one end positioned proximate to a downstream end of the third conveyor; and
   a fan configured to draw a vacuum through the telescoping loading spout and the duct.

2. The system of claim 1, wherein the knife gate is configured to release the material, wherein the funnel centers the material on the first conveyor such that greater than 90% of the material is positioned within a middle 80% of a width of the first conveyor, and wherein the first conveyor is configured to convey the material.

3. The system of claim 1, wherein the derrick is configured to be oriented substantially horizontally when the system is in a folded state, wherein the system is configured to be coupled to a vehicle and to be moved by the vehicle when in the folded state, and wherein the derrick is configured to be oriented substantially vertically when the system is in the unfolded state.

4. The system of claim 1, wherein the second conveyor comprises a bucket elevator.

5. The system of claim 1, wherein the drum motor is positioned within a housing in the derrick, and wherein a length of the drum motor is from 30 inches to 40 inches, and a width of the drum motor is from 22 inches to 27 inches to allow the drum motor to be received within a bonnet or a head roller of the second conveyor.

6. The system of claim 1, wherein the drum motor allows the second conveyor to raise a predetermined amount of the material a predetermined distance in an hour, wherein the predetermined amount is from 300 tons to 600 tons, wherein the predetermined distance is from 50 feet to 100 feet, and wherein the predetermined distance is from a downstream end of the first conveyor to an upstream end of the third conveyor on the first arm.

7. The system of claim 1, wherein the duct is configured to pull the dust from the material through the duct and away from the downstream end of the third conveyor in response to a suction force generated by the fan.

8. The system of claim 1, wherein the system further comprises one or more vibrators positioned proximate to a transition between the second conveyor and the third conveyor, wherein the one or more vibrators facilitate movement of the material through the transition, and wherein the material has a moisture content greater than 2%.

9. The system of claim 1, wherein the base comprises:
   at least three sections including a middle section, wherein the funnel is located in the middle section, wherein the middle section is mounted on one or more isolators that allow the middle section to move with respect to the other sections; and
   a vibrator configured to vibrate the middle section to facilitate movement of the material through the funnel, and wherein the material has a moisture content greater than 2%.

10. A mobile silo-filling system, comprising:
    a base configured to be positioned on a ground, wherein the base comprises:
       a funnel configured to be positioned under a knife gate; and
       a first conveyor positioned under the funnel, wherein the knife gate is configured to release a proppant that flows through the funnel and onto the first conveyor, wherein the funnel centers the proppant on the first conveyor such that greater than 90% of the proppant is positioned within a middle 80% of a width of the first conveyor, and wherein the first conveyor is configured to convey the proppant;

a derrick having a first end that is coupled to the base, wherein the derrick is configured to be oriented substantially horizontally when the system is in a folded state, wherein the system is configured to be coupled to a vehicle and to be moved by the vehicle when in the folded state, wherein the derrick is configured to be oriented substantially vertically when the system is in an unfolded state, and wherein the derrick comprises:
  a second conveyor configured to receive the proppant from the first conveyor and to convey the proppant when the system is in the unfolded state, wherein the second conveyor comprises a bucket elevator; and
  a drum motor positioned proximate to a second end of the derrick, wherein the drum motor is positioned within a housing, wherein the drum motor powers the second conveyor, wherein a length of the drum motor is from 30 inches to 40 inches, and a width of the drum motor is from 22 inches to 27 inches to allow the drum motor to be received within a bonnet or a head roller of the second conveyor, and wherein the drum motor allows the second conveyor to raise from 300 tons to 600 tons of the proppant from 50 feet to 100 feet in an hour;

a first arm having a first end that is coupled to the second end of the derrick, wherein the first arm is configured to be substantially horizontal when the system is in the folded state and the unfolded state, wherein the first arm is configured to rotate around the first end thereof in a first horizontal plane, and wherein the first arm comprises:
  a third conveyor configured to receive the proppant from the second conveyor and to convey the proppant;
  a skirt that directs the proppant toward a middle portion of the third conveyor; and
  a deflector positioned downstream from the skirt, wherein the deflector consolidates the proppant as the proppant enters a transition from the third conveyor to a fourth conveyor, and wherein the deflector also reduces aeration and dust from the proppant proximate to the transition, wherein the deflector comprises:
    a central portion, wherein the central portion is curved, and wherein the central portion includes a front face and a back face;
    a first sidewall connected to a first side of the central portion, wherein the first sidewall is curved, and wherein the first sidewall extends outward from the front face;
    a second sidewall connected to a second side of the central portion, wherein the second sidewall is curved, and wherein the second sidewall extends outward from the front face;
    a neck connected to the back face of the central portion and extending upward therefrom; and
    a plate connected to an upper end of the neck, wherein the plate is positioned above the central portion, the first sidewall, and the second sidewall, and wherein the plate defines one or more openings therethrough that are configured to receive fasteners to couple the deflector to the mobile silo-filling system;

a second arm having a first end that is coupled to a second end of the first arm, wherein the second arm is positioned below the first arm, wherein the second arm is configured to be substantially horizontal when the system is in the folded state and the unfolded state, wherein the second arm is configured to rotate around the first end thereof in a second horizontal plane, and wherein the second arm comprises the fourth conveyor configured to receive the proppant from the third conveyor and to convey the proppant;

a loading spout coupled to the second arm proximate to a second end of the second arm, wherein the loading spout is configured to telescope vertically, and wherein the loading spout is configured to receive the proppant from the fourth conveyor and to load the proppant into an inlet in an upper portion of a silo;

a duct having ends positioned proximate to a downstream end of the third conveyor, a downstream end of the fourth conveyor, and the loading spout; and a fan configured to draw a vacuum through the duct and the loading spout.

11. The mobile silo-filling system of claim 10, wherein the fan is configured to generate a suction force within the duct to pull the dust from the proppant through the duct and away from the downstream end of the third conveyor, the downstream end of the fourth conveyor, and the loading spout.

12. The mobile silo-filling system of claim 10, further comprising one or more vibrators positioned proximate to a transition between the second conveyor and the third conveyor, the third conveyor and the fourth conveyor, the fourth conveyor and the loading spout, or a combination thereof, wherein the one or more vibrators facilitate movement of the proppant through the transition between the second conveyor and the third conveyor, and wherein the proppant has a moisture content greater than 2%.

13. The mobile silo-filling system of claim 10, wherein the base comprises at least three sections including a middle section, wherein the funnel is located in the middle section, wherein the middle section is mounted on one or more isolators that allow the middle section to move with respect to the other sections, and wherein the base further comprises a vibrator configured to vibrate the middle section to facilitate movement of the proppant through the funnel, and wherein the proppant has a moisture content greater than 2%.

14. A method for loading proppant into a silo, the method comprising:
  transporting a system to a site, wherein the system comprises a base, a derrick, a first arm, and a second arm, wherein a first portion of the base comprises a first conveyor, wherein a second portion of the base comprises a chassis, a suspension, and wheels, and wherein the first and second portions of the base are decoupled from one another while the system is being transported;
  actuating the system from a folded state into an unfolded state at the site, wherein the derrick is oriented substantially horizontally when the system is in the folded state, and wherein the derrick is oriented substantially vertically when the system is in the unfolded state;
  assembling, powering, operating, testing, and/or repairing the first portion before the first and second portions are coupled together;

coupling the first and second portions of the base together when the system is in the unfolded state;

positioning a knife gate over the first conveyor after the first and second portions of the base are coupled together;

transferring the proppant from the knife gate to the first conveyor, wherein transferring the proppant comprises fully opening the knife gate, wherein the proppant is transferred through a funnel of the base and onto a middle portion of the first conveyor, wherein less than 5% of the proppant is positioned on opposing outer edges of the first conveyor, and wherein the opposing outer edges each make up 10% of a width of the first conveyor; and conveying the proppant to the silo, wherein the proppant is conveyed from the first conveyor on the base to a second conveyor on the derrick, to a third conveyor on the first arm, to a fourth conveyor on the second arm, and into the silo, wherein the second conveyor is powered by a drum motor that is positioned proximate to an upper end of the derrick, wherein the first arm comprises:
  a skirt that directs the proppant toward a middle portion of the third conveyor; and
  a deflector positioned downstream from the skirt, wherein the deflector consolidates the proppant as the proppant enters a transition from the third conveyor to the fourth conveyor, and wherein the deflector also reduces aeration and dust from the proppant proximate to the transition, wherein the deflector comprises:
    a central portion, wherein the central portion is curved, and wherein the central portion includes a front face and a back face;
    a first sidewall connected to a first side of the central portion, wherein the first sidewall is curved, and wherein the first sidewall extends outward from the front face;
    a second sidewall connected to a second side of the central portion, wherein the second sidewall is curved, and wherein the second sidewall extends outward from the front face;
    a neck connected to the back face of the central portion and extending upward therefrom; and
    a plate connected to an upper end of the neck, wherein the plate is positioned above the central portion, the first sidewall, and the second sidewall, and wherein the plate defines one or more openings therethrough that are configured to receive fasteners to couple the deflector to the system.

15. The method of claim 14, wherein the first portion of the base is transported on a first vehicle, and wherein the second portion of the base is transported on a second vehicle.

16. The method of claim 14, further comprising suctioning the dust from a downstream end of the third conveyor or a downstream end of the fourth conveyor using a duct and a fan, wherein the fan is located on the silo.

17. The method of claim 14, further comprising vibrating a transition between the second conveyor and the third conveyor, the transition between the third conveyor and the fourth conveyor, or both, to facilitate movement of the proppant through the transition between the second conveyor and the third conveyor, and wherein the proppant has a moisture content greater than 2%.

18. The method of claim 14, wherein the base comprises at least three sections including a middle section, wherein the funnel is located in the middle section, wherein the middle section is mounted on one or more isolators that allow the middle section to move with respect to the other sections, and wherein the method further comprises vibrating the middle section to facilitate movement of the proppant through the funnel, and wherein the proppant has a moisture content greater than 2%.

19. The method of claim 14, wherein assembling, powering, operating, testing, and/or repairing the first portion before the first and second portions are coupled together comprises assembling the first portion before the first and second portions are coupled together.

20. The method of claim 14, wherein assembling, powering, operating, testing, and/or repairing the first portion before the first and second portions are coupled together comprises powering the first portion before the first and second portions are coupled together.

21. The method of claim 14, wherein assembling, powering, operating, testing, and/or repairing the first portion before the first and second portions are coupled together comprises operating the first portion before the first and second portions are coupled together.

22. The method of claim 14, wherein assembling, powering, operating, testing, and/or repairing the first portion before the first and second portions are coupled together comprises testing the first portion before the first and second portions are coupled together.

23. The method of claim 14, wherein assembling, powering, operating, testing, and/or repairing the first portion before the first and second portions are coupled together comprises repairing the first portion before the first and second portions are coupled together.

24. The method of claim 14, further comprising assembling and testing the first portion prior to assembling and testing the second portion.

25. The method of claim 14, further comprising assembling and testing the first portion simultaneously with assembling and testing the second portion.

26. The method of claim 14, further comprising assembling and testing the first portion after assembling and testing the second portion.

* * * * *